(12) United States Patent
Chakravarty et al.

(10) Patent No.: US 11,841,563 B2
(45) Date of Patent: Dec. 12, 2023

(54) ELECTRO-OPTIC MODULATORS THAT INCLUDE CAPS FOR OPTICAL CONFINEMENT

(71) Applicant: IMEC USA NANOELECTRONICS DESIGN CENTER, Inc., Kissimmee, FL (US)

(72) Inventors: Swapnajit Chakravarty, Austin, TX (US); Reza Safian, Orlando, FL (US)

(73) Assignee: IMEC USA NANOELECTRONICS DESIGN CENTER, Inc., Kissimmee, FL (US)

( * ) Notice: Subject to any disclaimer, the term of this patent is extended or adjusted under 35 U.S.C. 154(b) by 15 days.

(21) Appl. No.: 17/218,845

(22) Filed: Mar. 31, 2021

(65) Prior Publication Data

US 2022/0317483 A1 Oct. 6, 2022

(51) Int. Cl.
  *G02F 1/035* (2006.01)
  *G02F 1/03* (2006.01)
(52) U.S. Cl.
  CPC .......... *G02F 1/0356* (2013.01); *G02F 1/0316* (2013.01)
(58) Field of Classification Search
  CPC .................................................. G02F 1/0356
  See application file for complete search history.

(56) References Cited

U.S. PATENT DOCUMENTS

| 5,341,450 A | 8/1994 | Yamada et al. |
| 5,373,579 A | 12/1994 | Eda |

(Continued)

FOREIGN PATENT DOCUMENTS

| EP | 0662628 B1 | 5/2000 |
| JP | H07202316 A | 8/1995 |

(Continued)

OTHER PUBLICATIONS

Honardoost, Amirmahdi, Farzaneh Arab Juneghani, Reza Safian, and Sasan Fathpour. "Towards subterahertz bandwidth ultracompact lithium niobate electrooptic modulators." Optics express 27, No. 5 (2019): 6495-6501.

(Continued)

*Primary Examiner* — Rhonda S Peace
(74) *Attorney, Agent, or Firm* — McDonnell Boehnen Hulbert & Berghoff LLP

(57) ABSTRACT

The present disclosure relates to electro-optic modulators that include caps for optical confinement. One example embodiment includes an electro-optic modulator. The electro-optic modulator includes a first cladding layer. The electro-optic modulator also includes a second cladding layer. In addition, the electro-optic modulator includes a first waveguide. The first waveguide is at least partially encapsulated between the first cladding layer and the second cladding layer. Further, the electro-optic modulator includes a thin-film lithium niobate layer adjacent to the second cladding layer. The thin-film lithium niobate layer is on an opposite side of the second cladding layer from the first waveguide. Additionally, the electro-optic modulator includes a first cap positioned on an opposite side of the thin-film lithium niobate layer from the second cladding layer. The first cap enhances optical confinement within the thin-film lithium niobate layer. Still further, the electro-optic modulator includes a plurality of electrodes.

20 Claims, 11 Drawing Sheets

(56) References Cited

U.S. PATENT DOCUMENTS

| | | | |
|---|---|---|---|
| 5,428,225 A | 6/1995 | Silva et al. | |
| 5,757,985 A | 5/1998 | Ishizaka | |
| 6,122,414 A | 9/2000 | Shimizu | |
| 7,095,920 B1* | 8/2006 | Little | G02B 6/12002 385/14 |
| 7,450,811 B2* | 11/2008 | Hashimoto | G02B 6/126 385/129 |
| 10,718,904 B2 | 7/2020 | Fathpour et al. | |
| 10,788,689 B1* | 9/2020 | Lentine | G02F 1/0356 |
| 2012/0155824 A1 | 6/2012 | Suzuki et al. | |
| 2016/0268768 A1 | 9/2016 | Matsumoto | |
| 2021/0286203 A1* | 9/2021 | Safian | G02F 1/0356 |
| 2022/0163827 A1* | 5/2022 | Sugiyama | G02F 1/2255 |
| 2022/0317483 A1* | 10/2022 | Chakravarty | G02F 1/0316 |

FOREIGN PATENT DOCUMENTS

| | | |
|---|---|---|
| JP | H0921985 A | 1/1997 |
| JP | 2006251090 A | 9/2006 |
| WO | 2018096037 A1 | 5/2018 |

OTHER PUBLICATIONS

Rabiei, Payam, Jichi Ma, Saeed Khan, Jeff Chiles, and Sasan Fathpour. "Heterogeneous lithium niobate photonics on silicon substrates." Optics express 21, No. 21 (2013): 25573-25581.

Law, David J., Wael William Diab, Adam Healey, Steven B. Carlson, and Valerie Maguire. "IEEE 802.3 industry connections Ethernet bandwidth assessment." IEEE 802.3 Ethernet Working Group (2012).

Wang, Cheng, Mian Zhang, Brian Stern, Michal Lipson, and Marko Lončar. "Nanophotonic lithium niobate electro-optic modulators." Optics express 26, No. 2 (2018): 1547-1555.

Weigel, Peter O., Forrest Valdez, Jie Zhao, Huiyan Li, and Shayan Mookherjea. "Design of high-bandwidth, low-voltage and low-loss hybrid lithium niobate electro-optic modulators." Journal of Physics: Photonics 3, No. 1 (2020): 012001.

Pantouvaki, M., S. A. Srinivasan, Y. Ban, P. De Heyn, P. Verheyen, G. Lepage, H. Chen et al. "Active components for 50 GB/s NRZ-OOK optical interconnects in a silicon photonics platform." Journal of Lightwave Technology 35, No. 4 (2017): 631-638.

Li, Ke, Shenghao Liu, David J. Thomson, Weiwei Zhang, Xingzhao Yan, Fanfan Meng, Callum G. Littlejohns et al. "Electronic-photonic convergence for silicon photonics transmitters beyond 100 Gbps on-off keying." Optica 7, No. 11 (2020): 1514-1516.

Extended European Search Report and Written Opinion, Application No. EP22164398.4, dated Aug. 31, 2022, 12 pages.

Weigel, Peter O., Jie Zhao, Kelvin Fang, Hasan Al-Rubaye, Douglas Trotter, Dana Hood, John Mudrick et al. "Bonded thin film lithium niobate modulator on a silicon photonics platform exceeding 100 GHz 3-dB electrical modulation bandwidth." Optics express 26, No. 18 (2018): 23728-23739.

\* cited by examiner

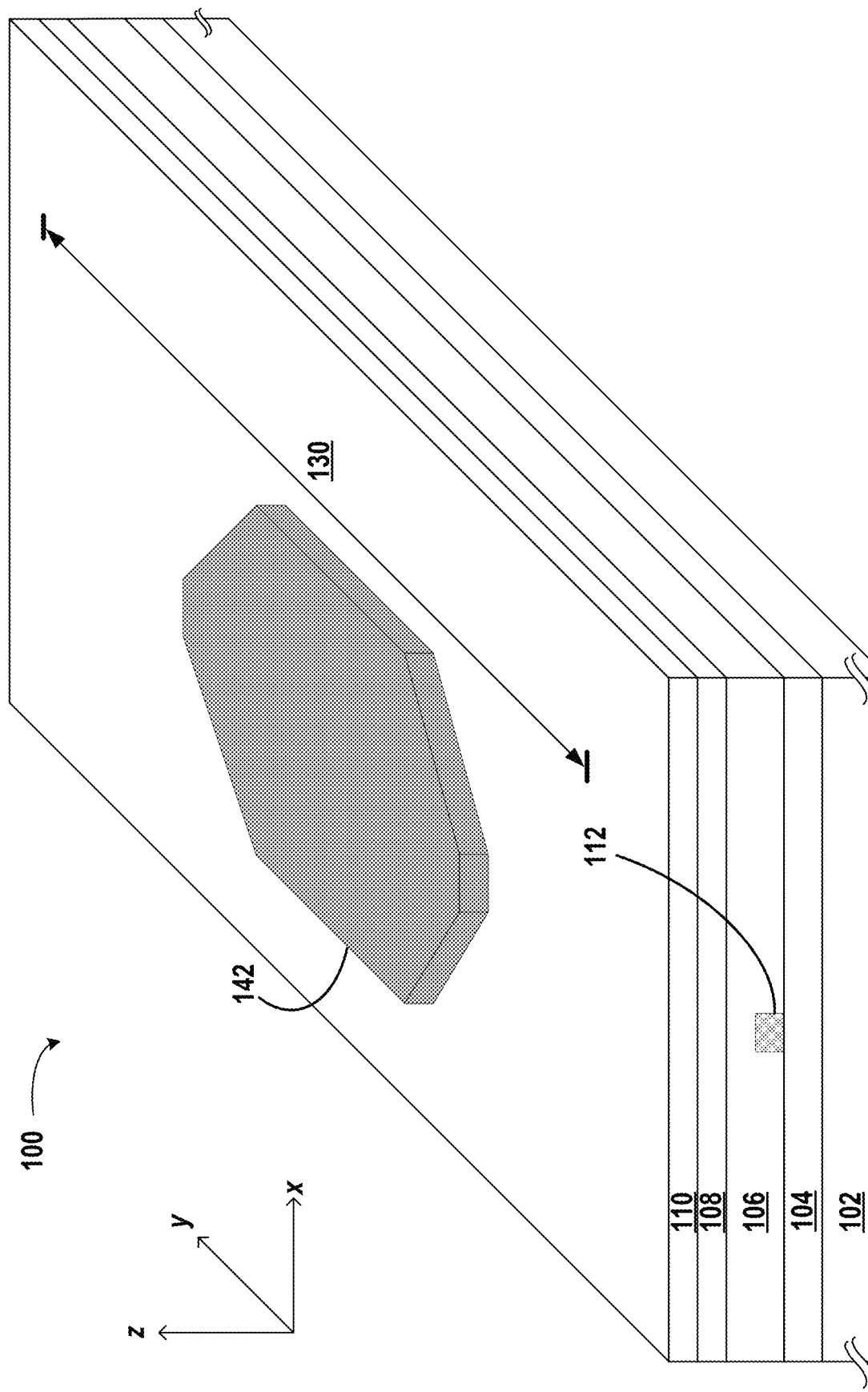

ELECTRO-OPTIC MODULATORS THAT INCLUDE CAPS FOR OPTICAL CONFINEMENT

BACKGROUND

Unless otherwise indicated herein, the materials described in this section are not prior art to the claims in this application and are not admitted to be prior art by inclusion in this section.

Optical communication is widely used to transfer data from one entity to another in a high-bandwidth fashion. By transmitting and receiving modulated light signals, a substantial amount of data (e.g., 400 Gbps) can be communicated simultaneously within a communication channel. Such communications may be used in the delivery of fiber optic internet or in optical interconnects within computing devices, for example.

Light signals for optical communication can be modulated in a variety of ways to encode data. For example, light signals may be modulated directly (e.g., using a light source such as a laser). Alternatively, light signals may be modulated indirectly. For example, an electro-optic modulator may enable a modulation of the amplitude, phase, and/or polarization of a light signal based on one or more applied voltages and/or currents. In one type of electro-optic modulator, the properties of an electro-optic material (e.g., $LiNbO_3$ (lithium niobate)) can be modified through the application of an electric field within the material. A Pockels cell, for example, may be based around a material that experiences a change in refractive index due to applied electric field. By passing an optical signal through the Pockels cell while an electric field is modulated across a Pockels cell (e.g., due to an applied voltage), the modulation of the refractive index may result in a modulation of phase for the optical signal (e.g., thereby encoding data within the optical signal).

SUMMARY

The specification and drawings disclose embodiments that relate to electro-optic modulators that include caps for optical confinement.

In a first aspect, the disclosure describes an electro-optic modulator. The electro-optic modulator includes a first cladding layer. The electro-optic modulator also includes a second cladding layer. In addition, the electro-optic modulator includes a first waveguide. The first waveguide is at least partially encapsulated between the first cladding layer and the second cladding layer. Further, the electro-optic modulator includes a thin-film lithium niobate layer adjacent to the second cladding layer. The thin-film lithium niobate layer is on an opposite side of the second cladding layer from the first waveguide. Additionally, the electro-optic modulator includes a first cap positioned on an opposite side of the thin-film lithium niobate layer from the second cladding layer. The first cap enhances optical confinement within the thin-film lithium niobate layer. Still further, the electro-optic modulator includes a plurality of electrodes positioned on an opposite side of the thin-film lithium niobate layer from the second cladding layer and on a same side of the thin-film lithium niobate layer as the first cap.

In a second aspect, the disclosure describes a method. The method includes coupling a first electromagnetic wave into a first waveguide. The first waveguide is at least partially encapsulated between a first cladding layer and a second cladding layer. The method also includes applying a voltage differential between a plurality of electrodes. The voltage differential produces an electro-optic effect in a thin-film lithium niobate layer adjacent to the second cladding layer. The electro-optic effect results in modulation of the first electromagnetic wave. The thin-film lithium niobate layer is on an opposite side of the second cladding layer from the first waveguide. The plurality of electrodes is positioned on an opposite side of the thin-film lithium niobate layer from the second cladding layer. In addition, the method includes enhancing, by a first cap, optical confinement within the thin-film lithium niobate layer. The first cap is positioned on an opposite side of the thin-film lithium niobate layer from the second cladding layer and on a same side of the thin-film lithium niobate layer as the plurality of electrodes.

In a third aspect, the disclosure describes a method of manufacture. The method of manufacture includes providing a silicon-on-insulator (SOI) substrate. The SOI substrate includes a handle layer. The SOI substrate also includes a first cladding layer. In addition, the SOI substrate includes a waveguide layer. The method of manufacture also includes selectively etching the waveguide layer to define a first waveguide. In addition, the method of manufacture includes depositing a second cladding layer. Further, the method of manufacture includes planarizing the second cladding layer. Additionally, the method of manufacture includes bonding a thin-film lithium niobate layer to the second cladding layer. Still further, the method of manufacture includes depositing a cap. Even further, the method of manufacture includes performing a metallization step to add a plurality of electrodes.

In a fourth aspect, the disclosure describes a system. The system includes means-for coupling a first electromagnetic wave into a first waveguide. The first waveguide is at least partially encapsulated between a first cladding layer and a second cladding layer. The system also includes means-for applying a voltage differential between a plurality of electrodes. The voltage differential produces an electro-optic effect in a thin-film lithium niobate layer adjacent to the second cladding layer. The electro-optic effect results in modulation of the first electromagnetic wave. The thin-film lithium niobate layer is on an opposite side of the second cladding layer from the first waveguide. The plurality of electrodes is positioned on an opposite side of the thin-film lithium niobate layer from the second cladding layer. In addition, the system includes a means-for enhancing, by a first cap, optical confinement within the thin-film lithium niobate layer. The first cap is positioned on an opposite side of the thin-film lithium niobate layer from the second cladding layer and on a same side of the thin-film lithium niobate layer as the plurality of electrodes.

In a fifth aspect, the disclosure describes a system. The system includes a means-for providing a silicon-on-insulator (SOI) substrate. The SOI substrate includes a handle layer. The SOI substrate also includes a first cladding layer. In addition, the SOI substrate includes a waveguide layer. The system also includes a means-for selectively etching the waveguide layer to define a first waveguide. In addition, the system includes a means-for depositing a second cladding layer. Further, the system includes a means-for planarizing the second cladding layer. Additionally, the system includes a means-for bonding a thin-film lithium niobate layer to the second cladding layer. Still further, the system includes a means-for depositing a cap. Even further, the system includes a means-for performing a metallization step to add a plurality of electrodes.

The foregoing summary is illustrative only and is not intended to be in any way limiting. In addition to the illustrative aspects, embodiments, and features described above, further aspects, embodiments, and features will become apparent by reference to the figures and the following detailed description.

BRIEF DESCRIPTION OF THE FIGURES

FIG. 3B is an isometric illustration of an electro-optic modulator, according to example embodiments.

DETAILED DESCRIPTION

Figure 1A:
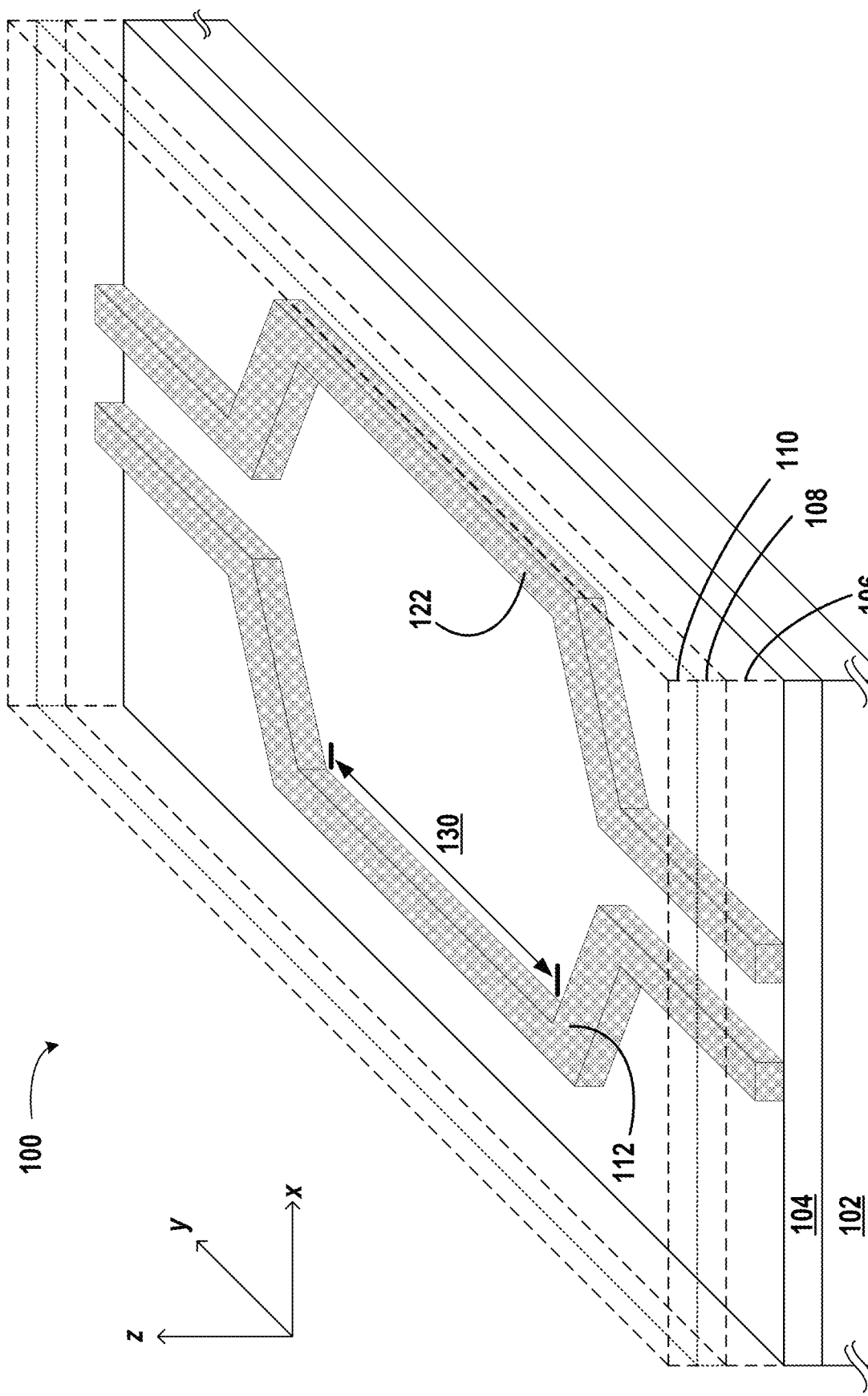
FIG. 1A is an isometric illustration of an electro-optic modulator, according to example embodiments.

Example methods and systems are described herein. Any example embodiment or feature described herein is not necessarily to be construed as preferred or advantageous over other embodiments or features. The example embodiments described herein are not meant to be limiting. It will be readily understood that certain aspects of the disclosed systems and methods can be arranged and combined in a wide variety of different configurations, all of which are contemplated herein.

Furthermore, the particular arrangements shown in the figures should not be viewed as limiting. It should be understood that other embodiments might include more or less of each element shown in a given figure. In addition, some of the illustrated elements may be combined or omitted. Similarly, an example embodiment may include elements that are not illustrated in the figures.

It is understood that where the terms "optical" or "visible" are used herein to describe electromagnetic waves or lights signals, other wavelengths could also be used and are contemplated herein. For example, similar techniques and devices to those described herein could be used for radio waves, infrared waves, etc. with appropriate adjustments where necessary (e.g., changes in waveguide size to accommodate electromagnetic waves having different wavelengths). Likewise, the term "electro-optic modulator" is frequently used throughout to describe a device where an electrical signal (e.g., an applied voltage) can impart a modulation on a light signal (e.g., a light signal having an optical wavelength). However, the term "electro-optic modulator" is used generally and is not meant to limit the wavelengths of the modulated light signal to only those within the optical spectrum or visible spectrum.

I. OVERVIEW

Example embodiments relate to electro-optic modulators that include caps for optical confinement. Electro-optic modulators, as described herein, may be capable of using a voltage signal applied across one or more electrodes to modulate an optical signal. For example, a thin-film lithium niobate layer may be placed in proximity to a plurality of electrodes. When a voltage is applied across the electrodes (e.g., when a voltage is applied to the signal electrode such that there is a differential in electrical potential between the signal electrode and a ground electrode), an electric field may be induced in the thin-film lithium niobate layer. As a result of the electric field in the thin-film lithium niobate layer, the thin-film lithium niobate layer may experience a change in refractive index (e.g., due to the electro-optic effect). The change in refractive index may impact one or more electromagnetic waves (e.g., optical signals) being guided by the thin-film lithium niobate layer. For example, when the refractive index of the thin-film lithium niobate layer is increased due to the electro-optic effect, electromagnetic waves being guided by the thin-film lithium niobate layer may travel slower. Because the phase of an electromagnetic wave is proportional to the speed at which the electromagnetic wave travels, the voltage applied across the electrodes results in a change in phase of the electromagnetic wave.

Based on the technique described above, by modulating the voltage applied across the electrodes, a corresponding modulation in one or more electromagnetic waves guided by the thin-film lithium niobate layer can also be achieved. In other words, an electrical modulation can be transformed into an optical modulation, thereby encoding data into an optical signal (e.g., an electromagnetic wave having a wavelength within the telecommunication band, which is between 1260 nm and 1650 nm). In some embodiments, the electro-optic modulator may be arranged as a Mach-Zehnder electro-optic modulator. A Mach-Zehnder electro-optic modulator may include a modulation region that has two arms. Each of the arms may include an optical waveguide by which a light signal is guided. Further, each of the arms may be positioned between pairs of electrodes. Further, the electric field applied within the thin-film lithium niobate layer may be different in the first arm than the second arm. For example, the two arms may be positioned between to two different ground electrodes and one common source electrode in a push-pull configuration (e.g., ground-source-ground (GSG) configuration), where the waveguide in one arm experiences an approximately equal and opposite electric field to the waveguide in the other arm. Prior to reaching the modulation region, a light signal may be broken into two partial signals (e.g., a first partial signal and a second partial signal). Then, the first partial signal may be transmitted down the first arm of the Mach-Zehnder electro-optic modulator and the second partial signal may be transmitted down the second arm of the Mach-Zehnder electro-optic modulator. Next, based on the different electric fields applied, the two partial signals may experience different modulations (e.g., different phase modulations). Thereafter, the partial signals may be recombined, resulting in a combined signal that incorporates a relative phase shift between two partial signals. This relative phase shift may encode data for transmission.

While thin-film lithium niobate is described herein as being used to transduce an electrical modulation into an optical modulation, it is understood that other materials (e.g., other materials that experience the electro-optic effect) could also be used and are contemplated herein. Likewise, while phase modulation has been described above, other types of modulation (e.g., amplitude modulation, frequency modulation, etc.) are also possible and contemplated herein.

Electro-optic modulators, such as those described herein, may include electrodes across which a voltage is applied to induce modulation in an electromagnetic wave (e.g., optical signal) that is propagated in the vicinity of the electrodes. Hence, to modulate the electromagnetic wave, energy is consumed by applying a voltage. Further, in some embodiments, the voltage signal may be modulated at tens or hundreds of GHz (e.g., 100 GHz, 200 GHz, 300 GHz, 400 GHz, etc.) to induce a modulation into the electromagnetic wave. As a result of this, the power consumed (i.e., switching power) in performing the modulation may be non-negligible. If the rate at which the voltage signal is modulated is to remain the same (or even increase), which may be prudent in order to enhance data communication speed, then the primary way to reduce the amount of switching power consumed is by reducing the modulation voltage used (e.g., by reducing the modulation voltage need to successfully induce a phase modulation in a Mach-Zehnder electro-optic modulator).

In a phase-based electro-optic modulator (e.g., a Mach-Zehnder electro-optic modulator), one metric that measures the minimum voltage used to induce modulation based on the length of the modulation region of the electro-optic modulator is referred to as $V_\pi$-L. In other words, the voltage needed to induce a phase shift of $\pi$ radians (i.e., $V_\pi$) over the length of the modulation region (L). One factor that is correlated with this metric (e.g., results in reduced V-L) is optical confinement. The greater the optical confinement of the optical signal (e.g., within a thin-film lithium niobate layer/associated waveguide), the greater impact the modulation in the refractive index due to the applied voltage has on the optical signal. Hence, by enhancing optical confinement, $V_\pi$-L may be reduced, thereby reducing power consumption in electro-optic modulation.

The embodiments described herein may provide electro-optic modulators that have reduced $V_\pi$-L when compared with alternative electro-optic modulators. The electro-optic modulators described herein may include one or more waveguides that are at least partially surrounded by one or more cladding layers. Further, adjacent to (e.g., above) or proximate to the waveguide(s) may be a thin-film lithium niobate layer (or some other layer that can be modified using the electro-optic effect). This thin-film lithium niobate layer may be modulated by a voltage signal applied across a plurality of electrodes (e.g., metal electrodes), which results in an applied electric field within the thin-film lithium niobate layer. Such electrodes may be positioned above the thin-film lithium niobate layer within the modulation region of the electro-optic modulator, for example. An optical signal to be modulated (e.g., in phase) as a result of the modulation within the thin-film lithium niobate layer may propagate along the electro-optic modulator with a propagation mode that resides partially in at least one of the waveguides and partially within the thin-film lithium niobate layer.

In order to reduce $V_\pi$-L, the electro-optic modulators herein may include one or more caps (e.g., within the modulation region and positioned between the electrodes used to modulate the electric field within the thin-film lithium niobate layer). The cap(s) may overlay the thin-film lithium niobate layer and result in enhanced optical signal confinement of the optical signal when compared to electro-optic modulators without the one or more caps. The cap(s) may be made of SiN, for example. Because the optical signal propagating through the electro-optic modulator is further confined (e.g., the lateral spread of the propagating mode within the thin-film lithium niobate layer is reduced), the electrodes may be closer to one another without sacrificing the effect the applied electric field has on the propagating optical signal. As a result of the electrodes being placed closer to one another, the electric field within the thin-film lithium niobate layer for a given voltage is enhanced. Alternatively, for a given electric field within the thin-film lithium niobate layer, the voltage applied across the electrodes may be reduced. A reduction in the voltage applied corresponds to a reduction in $V_\pi$-L, which results in a lower power consumption for a given electro-optic modulation.

The one or more caps may be positioned adjacent to various regions of the waveguides, various regions of the thin-film lithium niobate layer(s), and/or any portion of the electro-optic modulator through which the optical signal propagates. For example, if the electro-optic modulator is a Mach-Zehnder electro-optic modulator, a first cap may be positioned above a first arm in the modulation region of the Mach-Zehnder electro-optic modulator and a second cap may be positioned above a second arm in the modulation region of the Mach-Zehnder electro-optic modulator. As such, enhanced optical confinement may occur in multiple regions of the electro-optic modulator. It is understood, however, that even a single cap may result in enhanced optical confinement and is contemplated herein. Further, while a Mach-Zehnder electro-optic modulator is used herein as an example, it is understood that other types of electro-optic modulators are also possible and are contemplated herein.

In addition to the electro-optic modulators described above, embodiments described herein include methods of using such electro-optic modulators, as well as methods of manufacturing such electro-optic modulators. Alternative methods used to reduce $V_\pi$-L may include positioning the waveguide(s) as close to the thin-film lithium niobate layer as possible. However, in order to do this, one or more of the cladding layers (e.g., $SiO_2$ layers) may be etched during fabrication prior to adding the thin-film lithium niobate layer. With present fabrication techniques, though, it may be difficult to uniformly etch the cladding layer. This may result in up to tens of nm of under-etch (e.g., leaving a portion of the cladding layer intact in some regions) and/or an over-etch (e.g., etching into a portion of one or more of the waveguides in some regions) across various portions of the electro-optic modulators, which could have adverse effects. By including the one or more caps, as described herein, such an etch is not necessarily performed or may be performed with higher tolerance and, therefore, such adverse effects may be avoided.

The electro-optic modulator described above and throughout this disclosure may be fabricated from an initial silicon on insulator (SOT) wafer. In such examples, an SOT wafer may include a silicon "handle" layer, a buried oxide layer (BOX), and a high-quality silicon layer or "waveguide layer." For example, the waveguide(s) may be defined within the silicon layer (i.e., a waveguide layer) of the SOT wafer. Hence, the waveguide(s) may be positioned on (e.g., above) the buried oxide layer (i.e., a first cladding layer) of the SOT wafer. The first cladding layer may include $SiO_2$ or another insulator. It is understood that where the term "SOT" is used throughout the description, other semiconductor-insulator-semiconductor structures are also possible and contemplated herein.

Defining the waveguide(s) may include performing one or more selective etches of the waveguide layer (e.g., using one or more photolithography steps). Further, in some embodiments, a second cladding layer (e.g., a second $SiO_2$ layer) may be deposited or grown over portions (or the entirety) of the waveguide(s). As such, in some embodiments, the waveguide(s) may be encapsulated between the first cladding layer and the second cladding layer. Based on the refractive index mismatch between the waveguide layer (e.g., made of silicon) and the cladding layers (e.g., made of $SiO_2$), the waveguide(s) (e.g., along with the thin-film lithium niobate layer) may be able to effectively guide signals along the electro-optic modulator. The thin-film lithium niobate layer may then be bonded to at least one of the layers of the electro-optic modulator (e.g., bonded to the second cladding layer). Thereafter, the cap(s) may be deposited and a metallization step may be performed to incorporate a plurality of electrodes, thereby forming an electro-optic modulator.

While embodiments described herein may include a thin-film lithium niobate layer, it will be understood that other linear and non-linear optical materials are contemplated and possible. For example, lithium tantalate and potassium titanyl phosphate, among other possibilities, could be used as active optical materials within the scope of the present disclosure.

II. EXAMPLE SYSTEMS

The following description and accompanying drawings will elucidate features of various example embodiments. The embodiments provided are by way of example, and are not intended to be limiting. As such, the dimensions of the drawings are not necessarily to scale.

Figure 1B:
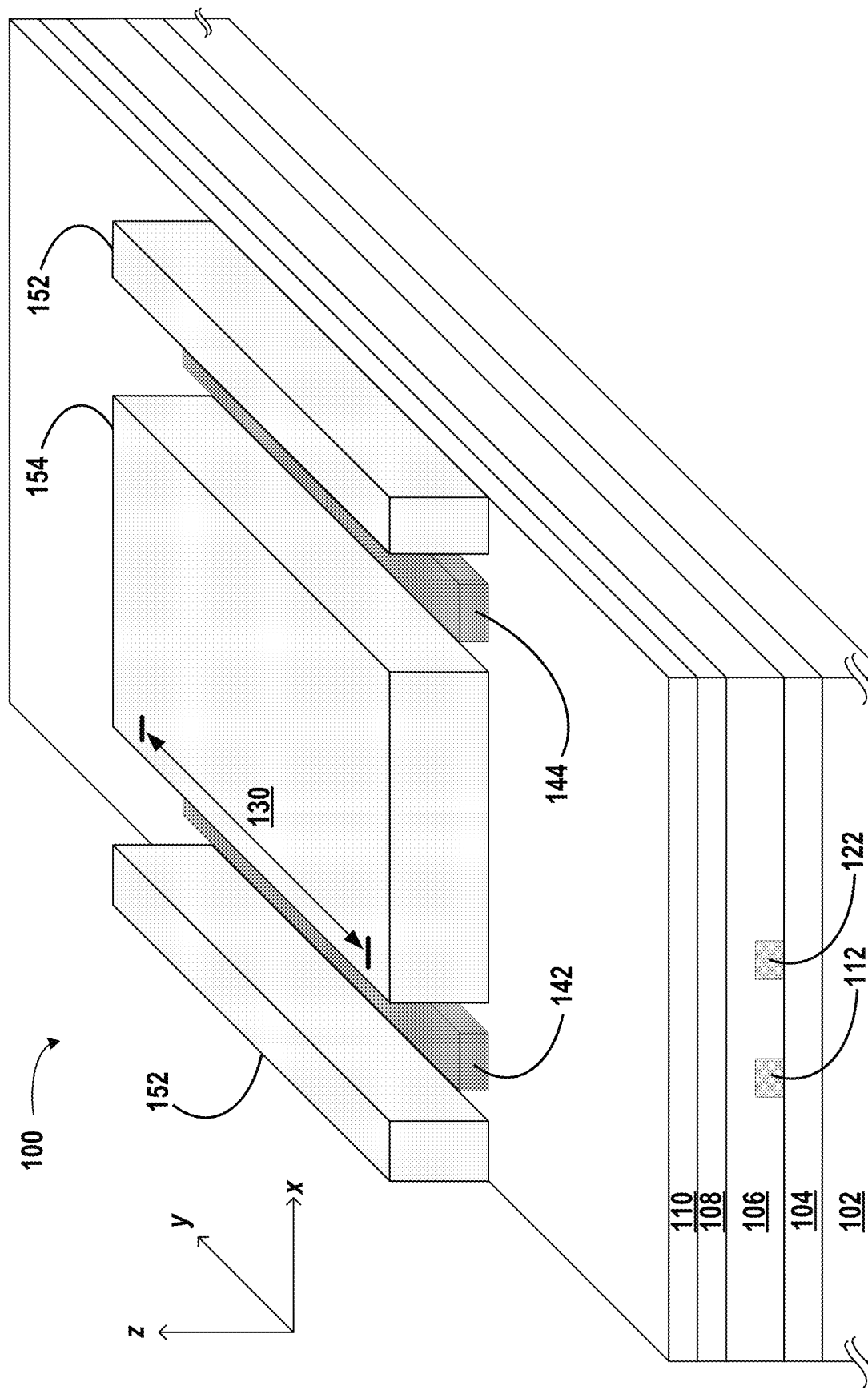
FIG. 1B is an isometric illustration of an electro-optic modulator, according to example embodiments.
Figure 2:
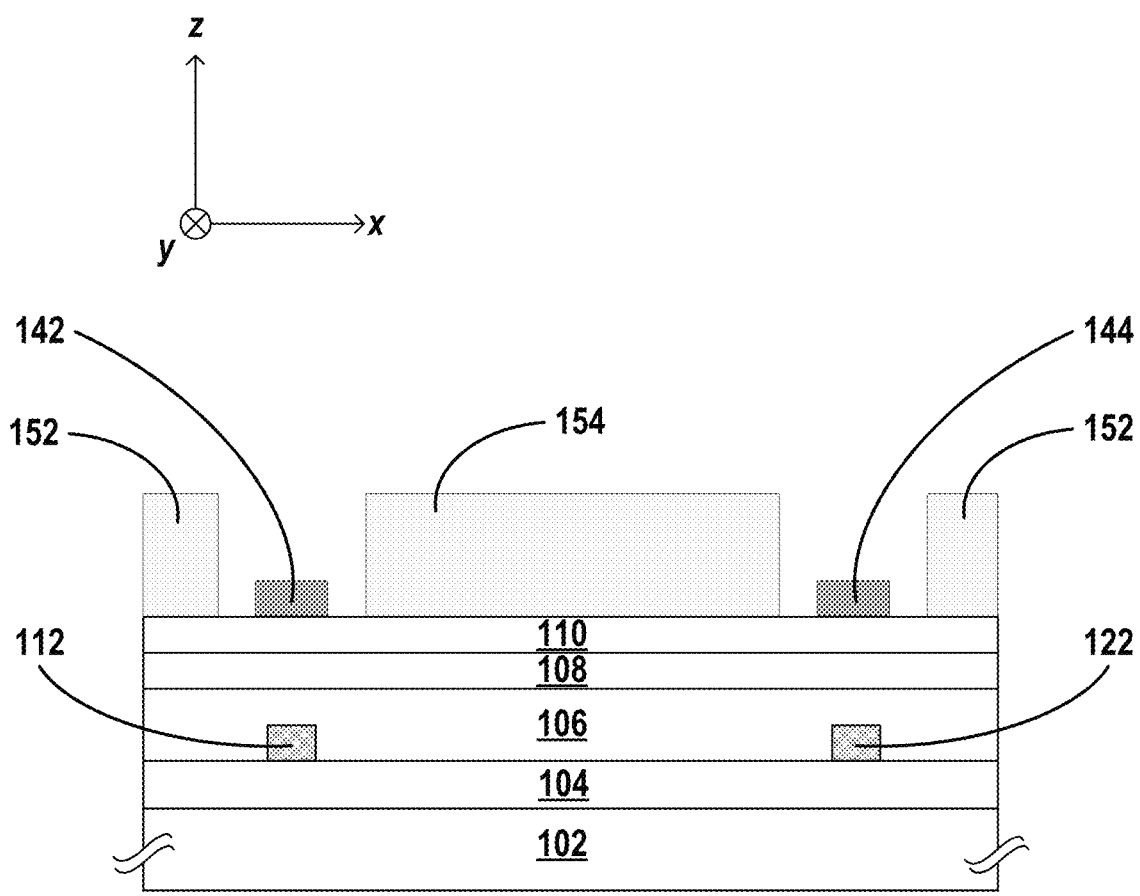
FIG. 2 is a cross-sectional illustration of an electro-optic modulator, according to example embodiments.

FIGS. 1A, 1B, and 2 are illustrations of an electro-optic modulator 100, according to example embodiments. The electro-optic modulator 100 may be a Mach-Zehnder electro-optic modulator, for example. The electro-optic modulator 100 may include a handle layer 102, a first cladding layer 104, a second cladding layer 106, a thin-film lithium niobate layer 108, a third cladding layer 110, a first waveguide 112, a second waveguide 122, a first cap 142, a second cap 144, and a plurality of electrodes (e.g., including two ground electrodes 152 and a source electrode 154). In addition, as illustrated in FIGS. 1A and 1B, a length portion (i.e., a portion along the y-direction, as illustrated in FIGS. 1A, 1B, and 2) of the electro-optic modulator 100 may represent a modulation region 130. The electro-optic modulator 100 illustrated in FIGS. 1A, 1B, and 2 may be used to modulate optical signals across the entire telecommunication band (e.g., from the bottom of the O-band to the top of the C-band). The dimensions and/or shapes (e.g., angles of tapers) of one or more of the structures in the electro-optic modulator 100 may be chosen based on the wavelength range for which the electro-optic modulator 100 is designed. Other wavelength ranges (e.g., wavelengths below 1260 nm or above 1650 nm), including non-optical wavelength ranges, are also possible and are contemplated herein (e.g., with appropriate modifications to dimensions and/or materials as may be required).

The illustrations of the electro-optic modulator 100 in FIGS. 1A and 1B are shown from an isometric perspective whereas the illustration of the electro-optic modulator 100 in FIG. 2 is shown in a cross-sectional perspective (e.g., a cross section in the modulation region 130 of the electro-optic modulator 100). For illustration purposes, the first cap 142, the second cap 144, and the plurality of electrodes 152, 154 are not illustrated in FIG. 1A and the second cladding layer 106, the thin-film lithium niobate layer 108, and the third cladding layer 110 have been made transparent (illustrated using dashed and dotted lines) such that the first waveguide 112 and the second waveguide 122 are visible. In FIG. 1B, however, the second cladding layer 106, the thin-film lithium niobate layer 108, and the third cladding layer 110 have been illustrated as opaque. It is understood that the transparency or opacity of the different elements of the drawings do not correspond to transmissivity related to light in the optical wavelength spectrum, or any wavelength for that matter, and are simply used for illustrative purposes. In addition, it is understood that all of the relative dimensions (e.g., width dimensions in the x-direction, length dimensions in the y-direction, and thickness dimensions in the z-direction) that are illustrated are not necessarily drawn to scale.

As illustrated in FIGS. 1B and 2, the plurality of electrodes 152, 154 may be disposed adjacent to the first cap 142 and the second cap 144 within the modulation region 130 of the electro-optic modulator 100. Relatedly, at least a portion of the first cap 142 and the second cap 144 may be positioned above at least a portion of the first waveguide 112 and the second waveguide 122, respectively, within the modulation region 130 of the electro-optic modulator 100.

The electro-optic modulator 100 illustrated in FIGS. 1A, 1B, and 2 may have been fabricated using a series of fabrication steps (e.g., as shown and described with reference to FIGS. 4A-4K). For example, the electro-optic modulator 100 may be at least partially fabricated from a SOI wafer that includes the handle layer 102 (e.g., a bulk silicon layer). The SOI wafer may also include the first cladding layer 104 (e.g., a $SiO_2$ oxide layer) and a silicon waveguide layer from which the first waveguide 112 and the second waveguide 122 were selectively etched. Thereafter, the second cladding layer 106 may be deposited on or grown on the first waveguide 112 and the second waveguide 122 to encapsulate the first waveguide 112 and the second waveguide 122 between the first cladding layer 104 and the second cladding layer 106. As such, the resulting handle layer 102, the first waveguide 112, and the second waveguide 122 may each be made of Si. Further, the first cladding layer 104 and the second cladding layer 106 may each be made of $SiO_2$. It is understood, though, that in other embodiments other materials may be used. For example, the handle layer 102, the first waveguide 112, and/or the second waveguide 122 may be made of SiN. In some embodiments, the first waveguide 112 and the second waveguide 122 may be fabricated from the same material as one another. However, in alternate embodiments, the first waveguide 112 and the second waveguide 122 may include one or more different materials from one another.

Further, each of the layers of the device (e.g., the handle layer 102, the first cladding layer 104, the second cladding layer 106, etc.) may have different thicknesses (e.g., z-dimensions, as illustrated in FIGS. 1A, 1B, and 2) from one another. For example, the first cladding layer 104 may have a thickness between 2.5 µm and 3.5 µm. Additionally, the second cladding layer 106 may have a thickness that varies between 100 nm and 200 nm across the second cladding layer 106 (e.g., as a result of a non-uniform etch and/or deposition). Further, the thin-film lithium niobate layer 108 may be between 300 nm and 700 nm in thickness. In addition, the plurality of electrodes 152, 154 may have a thickness of between 1.5 µm and 2.5 µm. Still further, the third cladding layer 110 may have a thickness of between 80 nm and 120 nm. Even further, the handle layer 102 may have a thickness of between 710 µm and 740 µm. It is understood that these thicknesses are provided solely as examples and that other thicknesses are also possible and are contemplated herein.

The handle layer 102 may be a Si layer (e.g., provided from an SOI wafer). The handle layer 102 may, as illustrated in FIGS. 1A, 1B, and 2, be positioned on an opposite side of the first cladding layer 104 from the first waveguide 112 and the second waveguide 122. As described above, the illustrations of FIGS. 1A, 1B, and 2 are not necessarily to scale. As such, the handle layer 102 may be many times thicker than the other layers. This is indicated in the illustration of FIGS. 1A, 1B, and 2 by the break along the z-dimension of the handle layer 102. It is understood, though, that the fact that other layers do not include such a break illustrated along any of their dimensions is not meant to indicate or imply that those layers are necessarily drawn to scale.

The first cladding layer 104 may be an oxide layer (e.g., provided from the BOX of an SOI wafer). For example, the first cladding layer 104 may include $SiO_2$. It is understood that other oxides are also possible and are contemplated herein.

The second cladding layer 106 may be an oxide layer (e.g., provided from a chemical vapor deposition process or a thermal oxidation process). For example, the second cladding layer 106 may include $SiO_2$. It is understood that other oxides are also possible and are contemplated herein. Further, the second cladding layer 106 may have been planarized during fabrication, in some embodiments. Planarization may include performing a chemical-mechanical polishing process.

The thin-film lithium niobate layer 108, as described above, may be a layer of material that experiences the electro-optic effect (e.g., as a result of a voltage signal being applied between the plurality of electrodes 152, 154). The thin-film lithium niobate layer 108 may be prepared and then bonded to the second cladding layer 106, in some embodiments. Other methods of providing the thin-film lithium niobate layer 108 are also possible and are contemplated herein. It is understood that other thin-film layers (e.g., other thin-film layers that experience the electro-optic effect) are also possible and are contemplated herein. Further, as illustrated in FIG. 2, the thin-film lithium niobate layer 108 may be positioned between the first cap 142/the second cap 144 and the first waveguide 112/the second waveguide 122, respectively (e.g., along a first arm and a second arm, respectively, in the modulation region 130 of the Mach-Zehnder electro-optic modulator). However, it is understood that, rather than a single thin-film lithium niobate layer 108, multiple thin-film lithium niobate strips (e.g., each corresponding to a separate pair of electrodes within the plurality of electrodes 152, 154) could be used.

The third cladding layer 110 may be an oxide layer (e.g., provided from a chemical vapor deposition process, such as a plasma-enhanced chemical vapor deposition process). For example, the third cladding layer 110 may include $SiO_2$. It is understood that other oxides are also possible and are contemplated herein. As illustrated in FIGS. 1A, 1B, and 2, the third cladding layer 110 may be positioned between the thin-film lithium niobate layer 108 and the first cap 142/the second cap 144. In some embodiments, the electro-optic modulator 100 may not include the third cladding layer 110. In such embodiments, the first cap 142 and the second cap 144 may be located directly on the thin-film lithium niobate layer 108. The third cladding layer 110 may be included in the electro-optic modulator 100 to provide further fine-tuning for electro-optic coupling, within the modulation region 130, between a voltage signal applied across the plurality of electrodes and the optical signal propagating through the electro-optic modulator 100.

The first waveguide 112 and the second waveguide 122 may be at least partially encapsulated (e.g., within the modulation region 130 of the electro-optic modulator 100) between the first cladding layer 104 and the second cladding layer 106. The first waveguide 112 may be a portion of a first arm of the Mach-Zehnder electro-optic modulator and the second waveguide 122 may be a portion of a second arm of the Mach-Zehnder electro-optic modulator.

The first arm and/or the second arm of the Mach-Zehnder electro-optic modulator may each have a length (i.e., ay-dimension, as illustrated in FIGS. 1A, 1B, and 2) of between 5 mm and 10 mm. Likewise, the modulation region 130 of the Mach-Zehnder electro-optic modulator may also have a length of between 5 mm and 10 mm. Further, a width (i.e., a x-dimension, as illustrated in FIGS. 1A, 1B, and 2) of the first waveguide 112 and/or a width of the second waveguide 122 may be between 220 nm and 260 nm. In addition, the first waveguide 112 and/or the second waveguide 122 may be made of Si or SiN (e.g., based on a selective etch of a high-quality Si layer of a SOI wafer).

It is understood that the Mach-Zehnder electro-optic modulator is used purely as an example and that other electro-optic modulators are also possible and are contemplated herein. In alternate electro-optic modulators, for example, there may be only a single waveguide (e.g., on the first waveguide 112).

In the electro-optic modulator 100 illustrated FIGS. 1A, 1B, and 2, the first waveguide 112 may receive electromagnetic waves (i.e., signals) at an input end of the first waveguide 112 (e.g., via an optical coupling to an input waveguide, as shown and described with reference to FIG. 5). Similarly, the second waveguide 122 may receive electromagnetic waves (i.e., signals) at an input end of the second waveguide 122 (e.g., via an optical coupling to an input waveguide, as shown and described with reference to FIG. 5). The signals received by the first waveguide 112 and the second waveguide 122 may be split-off portions of the same input signal (e.g., as shown and described with reference to FIG. 5). Upon receiving the electromagnetic waves, the electromagnetic waves may propagate along the electrooptic modulator 100 in a split mode that partially resides within the respective waveguide (i.e., the first waveguide 112 or the second waveguide 122) and partially resides within the thin-film lithium niobate layer 108.

Propagation of electromagnetic waves along the first waveguide 112 and/or the second waveguide 122 may occur, at least partially, based on guiding due to a mismatch between the material of the first waveguide 112/second waveguide 122 (e.g., Si or SiN) and the material of the surrounding first cladding layer 104 and second cladding layer 106 (e.g., $SiO_2$). The mismatch in materials may correspond to a mismatch in relative dielectric constants ($\varepsilon_r$)/refractive indices ($\eta$). For example, in embodiments where the first waveguide 112 and the second waveguide 122 are fabricated from Si and the first cladding layer 104 and the second cladding layer 106 are fabricated from $SiO_2$, there may be a mismatch of relative dielectric constants of ~11.68 ($\varepsilon_r$ of Si) to ~3.9 ($\varepsilon_r$ of $SiO_2$). It is understood that these values are given solely as examples, and that other materials may be used and/or the materials listed may have different relative dielectric constants depending on the wavelength of electromagnetic signal propagating within the materials.

As illustrated in FIGS. 1A, 1B, and 2, the first cap 142 may be positioned on an opposite side of the thin-film lithium niobate layer 108 from the second cladding layer 106. Further, the second cap 144 may be positioned on an opposite side of the thin-film lithium niobate layer 108 from the second cladding layer 106 and on a same side of the thin-film lithium niobate layer 108 as the first cap 142 and the plurality of electrodes 152, 154. The first cap 142 and/or the second cap 144 may have been deposited using a chemical vapor deposition process (e.g., a plasma-enhanced chemical vapor deposition process) or some other deposition process. Alternatively, a single capping layer may have been deposited and then selectively etched to define the first cap 142 and the second cap 144.

The first cap 142 and the second cap 144 may be used to confine the optical signals propagating through the electro-optic modulator 100 (e.g., within the first arm or the second arm, respectively, of the modulation region 130 of the electro-optic modulator 100). Such optical confinement may reduce the $V_\pi$-L based on the reasoning described above. For example, if the modulation region 130 has a length L, the maximum voltage required to induce a $\pi$ phase shift between the first arm and the second arm over L ($V_\pi$-L) may be 5 V-cm for electromagnetic waves (e.g., optical signals) transmitted through the first waveguide 112 (and the second waveguide 122) that have wavelengths between 1260 nm and 1650 nm.

In some embodiments, the first cap 142 and/or the second cap 144 may be made of SiN. Other optically confining materials for the first cap 142 and the second cap 144 are also possible and are contemplated herein. Further, a width (i.e., an x-dimension, as illustrated in FIGS. 1A, 1B, and 2) of the first cap 142 and/or a width of the second cap 144 may be between 1.5 μm and 3.0 μm. As indicated throughout, the dimensions illustrated in the drawings are not necessarily to scale (e.g., the widths of the first cap 142 and/or the second cap 144 may be significantly larger than the widths of the first waveguide 112 and/or the second waveguide 122).

The electrodes 152, 154 may be made of metal (e.g., Cu, Ag, Au, etc.). The plurality of electrodes 152, 154 may include ground electrodes 152 and a source electrode 154. For example, as illustrated, the ground electrodes 152 and the source electrode 154 may be arranged in a GSG/push-pull configuration along the first arm and the second arm of the modulation region 130 of the Mach-Zehnder electro-optic modulator. In such an arrangement, the driving voltage formed between a first electrode (e.g., one of the ground electrodes 152) and a second electrode (e.g., the source electrode 154) may be equal and opposite to the driving voltage formed between a third electrode (e.g., the other ground electrode 152) and the second electrode (e.g., the source electrode 154) when a voltage signal is applied to the source electrode 154. While a GSG/push-pull configuration for a Mach-Zehnder electro-optic modulator is illustrated in FIGS. 1A, 1B, and 2, it is understood that other electrode arrangements are also possible and are contemplated herein. As illustrated in FIGS. 1A, 1B, and 2, the plurality of electrodes 152, 154 may be positioned on an opposite side of the thin-film lithium niobate layer 108 from the second cladding layer 106 and on a same side of the thin-film lithium niobate layer 108 as the first cap 142 and the second cap 144.

As illustrated, at least two electrodes of the plurality of electrodes 152, 154 (e.g., one ground electrode 152 and the source electrode 154) may straddle the first cap 142 (e.g., on the third cladding layer 110). Similarly, at least two electrodes of the plurality of electrodes 152, 154 (e.g., one ground electrode 152 and the source electrode 154) may straddle the second cap 144 (e.g., on the third cladding layer 110). The spacing (e.g., along the x-axis illustrated in FIGS. 1A, 1B, and 2) between the electrodes straddling the first cap 142 and/or the spacing between the electrodes straddling the second cap 144 may be between 5.0 μm and 15.0 μm.

Figure 3A:
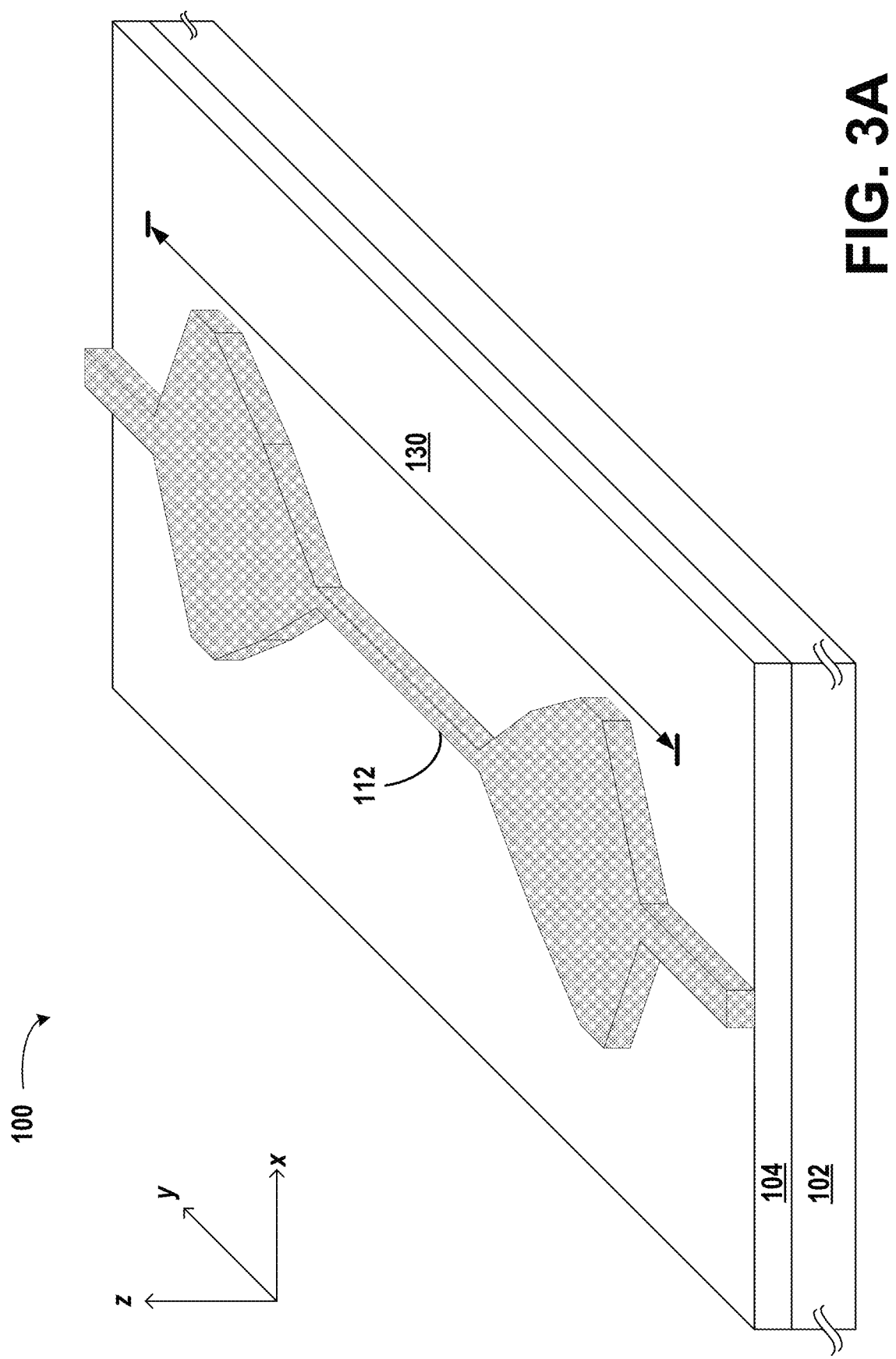
FIG. 3A is an isometric illustration of an electro-optic modulator, according to example embodiments.

In some embodiments, the first waveguide 112 and/or the second waveguide 122 may have a length (i.e., ay-dimension, as illustrated) that is greater than a length of the thin-film lithium niobate layer 108. Likewise, the first waveguide 112 and/or the second waveguide 122 may have a length that is greater than a length of the first cap 142 or the second cap 144, respectively, in some embodiments. Additionally, in some embodiments, the first waveguide 112 and/or the second waveguide 122 may be tapered (e.g., adiabatically tapered within the modulation region 130 of the electro-optic modulator 100). FIG. 3A illustrates an embodiment where the first waveguide 112 is adiabatically tapered in width (i.e., x-dimension) along a length (i.e., y-dimension) of the first waveguide 112 within the modulation region 130. In some embodiments, the first waveguide 112 and/or the second waveguide 122 may be adiabatically tapered (or reverse adiabatically tapered) as they approach the thin-film lithium niobate layer 108 and/or as they run away from the thin-film lithium niobate layer 108. Additionally or alternatively, the first waveguide 112 and/or the second waveguide 122 may be adiabatically tapered (or reverse adiabatically tapered) as they approach the first cap 142/second cap 144 and/or as they run away from the first cap 142/second cap 144.

In the embodiment illustrated in FIG. 3A, the first waveguide 112 may be tapered in a width in a portion of the first waveguide 112 that is positioned beneath the thin-film lithium niobate layer 108 (e.g., and also beneath the first cap 142). In some embodiments, the portion of the first waveguide 112 that is tapered in multiple stages. For example, the first waveguide 112 may first be tapered out to a width of between 900 nm and 1000 nm from a width of between 220 nm and 260 nm. Next, the first waveguide 112 may be tapered from a width of between 900 nm and 1000 nm to a width of between 320 nm and 360 nm. Thereafter, the first waveguide 112 may be tapered from a width of between 320 nm and 360 nm to a width of between 230 nm and 270 nm. Then (e.g., after traveling further along the modulation region 130), the first waveguide 112 may be reverse tapered (e.g., from between 230 nm and 270 nm in width to between 320 nm and 360 nm in width to between 900 nm and 1000 nm in width to between 220 nm and 260 nm in width).

In various embodiments, the first waveguide 112 and the second waveguide 122 may have the same tapers or different tapers. Further, in some embodiments, the first waveguide 112 may be tapered while the second waveguide 122 is not (or vice versa). Even further, in some embodiments, neither the first waveguide 112 nor the second waveguide 122 are tapered.

In addition, in some embodiments, the first cap 142 and/or the second cap 144 may also be tapered (e.g., adiabatically tapered). FIG. 3B illustrates a first cap 142 that is adiabatically tapered in width (i.e., x-dimension) within the modulation region 130 of the electro-optic modulator 100. In some embodiments, the adiabatic taper of the first cap 142 may occur at the same, or at least some of the same, y values as the adiabatic taper of the first waveguide 112 illustrated in FIG. 3A. In alternate embodiments, the adiabatic tapers of the first cap 142 and the first waveguide 112 may not overlap with one another.

Like the first waveguide 112 and the second waveguide 122, in some embodiments, the first cap 142 and the second cap 144 may have the same tapers or different tapers. Further, in some embodiments, the first cap 142 may be tapered while the second cap 144 is not (or vice versa). Even further, in some embodiments, neither the first cap 142 nor the second cap 144 will be adiabatically tapered.

Further, in some embodiments, the first cap 142 may be tapered while the first waveguide 112 is not (or vice versa). Likewise, in some embodiments, the second cap 144 may be tapered while the second waveguide 122 is not (or vice versa).

FIGS. 4A-4K are illustrations of steps of a fabrication technique, according to example embodiments. The fabrication technique may be used to fabricate the electro-optic modulator 100 shown and described with reference to FIGS. 1A, 1B, and 2, for example. In some embodiments, one or more of the fabrication steps illustrated in FIGS. 4A-4K may be performed in a cleanroom or other microelectronics fabrication facility. It is understood that the fabrication technique illustrated FIGS. 4A-4K is provided solely as an example and that other techniques are possible and are contemplated herein. For example, additional or alternative fabrication steps may be performed to fabricate the electro-optic modulator 100 of FIGS. 1A, 1B, and 2. Still further, some of fabrication steps may be omitted or performed in a different order than those illustrated. It is further understood that the illustrations of FIGS. 4A-4K are provided for understanding and that drawings are not necessarily to scale (e.g., the relative thicknesses and widths of the layers and components of the layers may be different than illustrated).

Figure 4A:
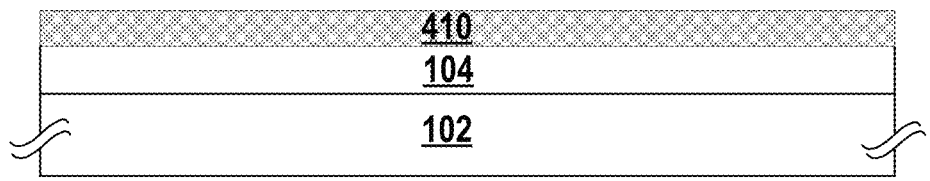
FIG. 4A is an illustration of a step in a method used to fabricate an electro-optic modulator, according to example embodiments.

FIG. 4A illustrates an initialization step of the fabrication technique. The initialization step may include providing a SOI substrate. The SOI substrate may include a handle layer 102, a first cladding layer 104, and a waveguide layer 410 on the first cladding layer 104. As illustrated, the first cladding layer 104 may be provided on the handle layer 102 and the waveguide layer 410 may be provided on the first cladding layer 104. In some embodiments, the handle layer 102, the first cladding layer 104, and the waveguide layer 410 may be provided together as a previously fabricated SOI wafer. In some embodiments, the handle layer 102 may be a portion of a Si wafer (e.g., having thickness between 710 μm and 740 μm). Further, the first cladding layer 104 may be an oxide layer (e.g., SiO₂ layer). The first cladding layer 104 may have a thickness between 2.5 μm and 3.5 μm. In addition, the waveguide layer 410 may be a Si layer (e.g., having thickness between 200 nm and 240 nm).

Figure 4B:
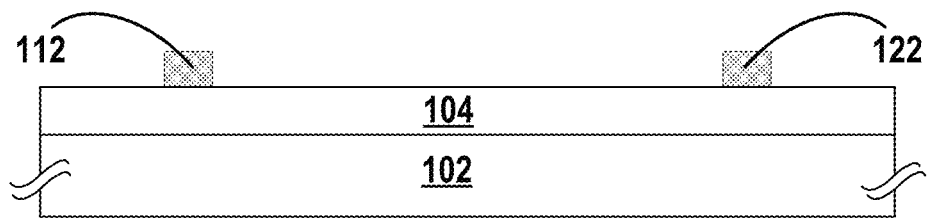
FIG. 4B is an illustration of a step in a method used to fabricate an electro-optic modulator, according to example embodiments.

FIG. 4B illustrates a selective etching process of the fabrication technique. As illustrated in FIG. 4B, the waveguide layer 410 may be selectively etched (e.g., chemically etched) to form the first waveguide 112 and the second waveguide 122. In some embodiments, the selective etching process may include multiple selective etches. Further, the selective etching process may include one or more wet etch steps and/or dry etch steps. Additionally or alternatively, the selective etching process may include one or more photolithography processing steps (e.g., to define one or more masks used to perform one or more selective etches). For example, a mask may include open portions below which an etch may occur and closed portions below which an etch may be prevented from occurring. In this way, regions of the waveguide layer 410 below the open portions of the mask may be etched away while the regions of the waveguide layer 410 below the closed portions of the mask may remain intact and define the first waveguide 112 and the second waveguide 122. In various embodiments, the etch depth(s) may vary. For example, as illustrated in FIG. 4B, the waveguide layer 410 may be selectively etched to remove the entire waveguide layer 410 other than the first waveguide 112 and the second waveguide 122. Additionally, in some embodiments, other waveguides (e.g., an input waveguide optically coupled to the first waveguide 112 or the second waveguide 122 and/or an output waveguide optically coupled to the first waveguide 112 or the second waveguide 122) may also be defined in the waveguide layer 410 based on the selective etch.

Figure 4C:
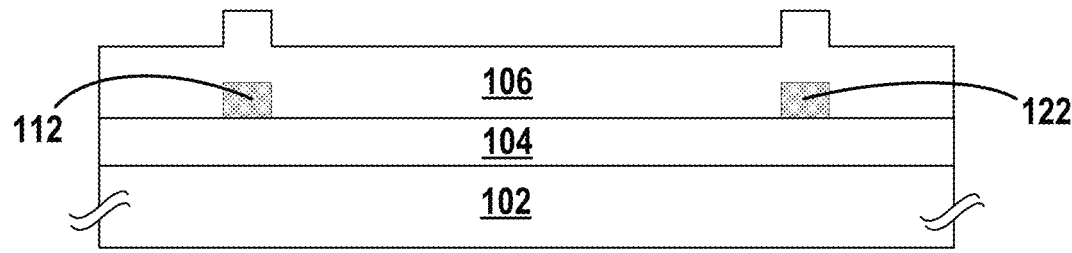
FIG. 4C is an illustration of a step in a method used to fabricate an electro-optic modulator, according to example embodiments.

FIG. 4C illustrates an oxide-providing step of the fabrication technique. For example, the oxide-providing step may include providing a second cladding layer 106 on portions of the first cladding layer 104, as well as the first waveguide 112 and the second waveguide 122. This may encapsulate the first waveguide 112 and the second waveguide 122 between the first cladding layer 104 and the second cladding layer 106, for example. In some embodiments, the second cladding layer 106 may be a SiO₂ layer (e.g., having thickness that varies between 100 nm and 200 nm across the second cladding layer 106). In some embodiments, the oxide-providing step may include depositing the second cladding layer 106 (e.g., using a chemical vapor deposition process, such as a plasma-enhanced chemical vapor deposition process). Alternatively, the second cladding layer 106 may be grown (e.g., using a dry or wet thermal oxidation).

Figure 4D:
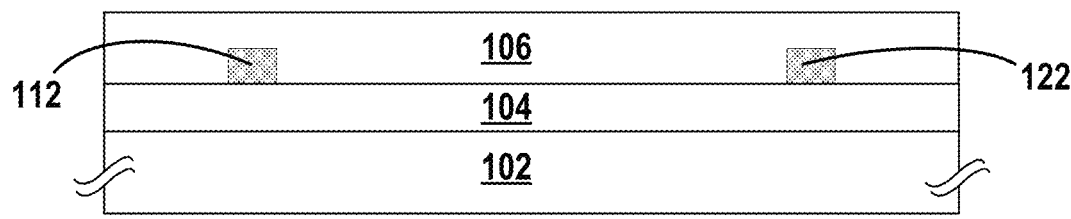
FIG. 4D is an illustration of a step in a method used to fabricate an electro-optic modulator, according to example embodiments.

FIG. 4D illustrates a planarization step of the fabrication technique. For example, the second cladding layer 106 provided in the oxide-providing step of FIG. 4C may be planarized (e.g., to remove excess portions from regions above the first waveguide 112 and/or the second waveguide 122). Planarizing may make a surface of the second cladding layer 106 approximately planar and substantially parallel with a surface of the first cladding layer 104 and/or the handle layer 102. In some embodiments, the planarization step may include performing a chemical-mechanical polishing (CMP) process. It is understood that additional or alternative planarization processes are also possible and are contemplated herein.

Figure 4E:
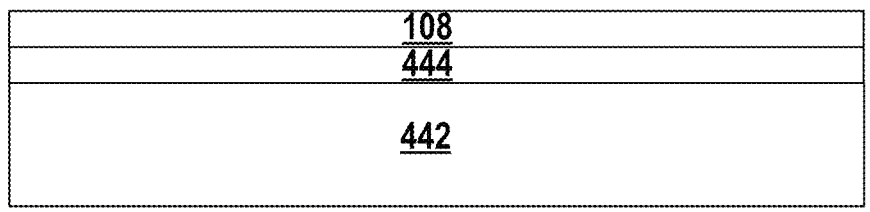
FIG. 4E is an illustration of a step in a method used to fabricate an electro-optic modulator, according to example embodiments.

FIG. 4E illustrates a thin-film lithium niobate-providing step of the fabrication technique. Providing thin-film lithium niobate may include providing a wafer. The wafer may include an intermediate handle layer 442 (e.g., a Si handle layer), an intermediate cladding layer 444 (e.g., a SiO₂ layer) that overlays the intermediate handle layer 442, and a thin-film lithium niobate layer 108 that overlays the intermediate cladding layer 444. As described below, all but the thin-film lithium niobate layer 108 may be removed from the finalized electro-optic modulator 100. Hence, the intermediate handle layer 442 and the intermediate cladding layer 444 may be used in fabrication but not in the operation of the electro-optic modulator 100.

Figure 4F:
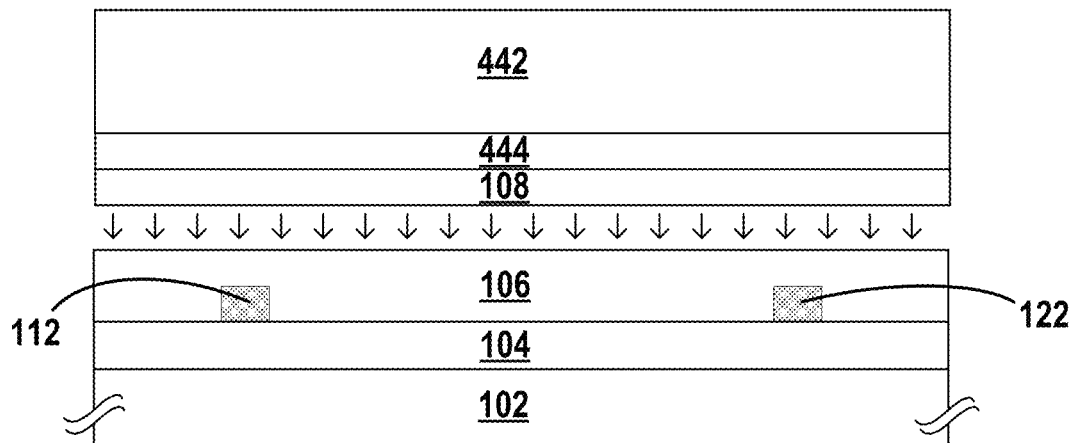
FIG. 4F is an illustration of a step in a method used to fabricate an electro-optic modulator, according to example embodiments.

FIG. 4F illustrates a bonding step of the fabrication technique. As illustrated in FIG. 4F, the bonding step may include inverting the wafer provided in the thin-film lithium niobate-providing step of FIG. 4E and then bonding the wafer (e.g., at a surface of the thin-film lithium niobate layer 108) to the surface of the second cladding layer 106 (e.g., that was planarized in the planarization step of FIG. 4D). Bonding the wafer to the surface of the second cladding layer 106 may position the thin-film lithium niobate layer 108 such that it is closer to the first waveguide 112 than the intermediate handle layer 442 and the intermediate cladding layer 444 are to the second cladding layer 106.

In some embodiments, prior to the bonding step illustrated in FIG. 4F, an alignment mark may be etched into the second cladding layer 106. Such an alignment mark may be used to align the wafer, and, therefore, the thin-film lithium niobate layer 108, with the underlying first waveguide 112 and second waveguide 122 when bonding the thin-film lithium niobate layer 108 to the second cladding layer 106. The alignment mark may be selectively etched using a chemical etch (e.g., a wet chemical etch or a dry chemical etch). Further, selectively etching the alignment mark using a chemical etch may include performing one or more photolithography steps (e.g., to define a mask used to etch the alignment mark). Additionally or alternatively, in some embodiments, an alignment mark may be etched into the wafer (e.g., into the thin-film lithium niobate layer 108). In such embodiments, the second cladding layer 106 may be bonded to the thin-film lithium niobate layer 108 (e.g., rather than vice versa).

Figure 4G:
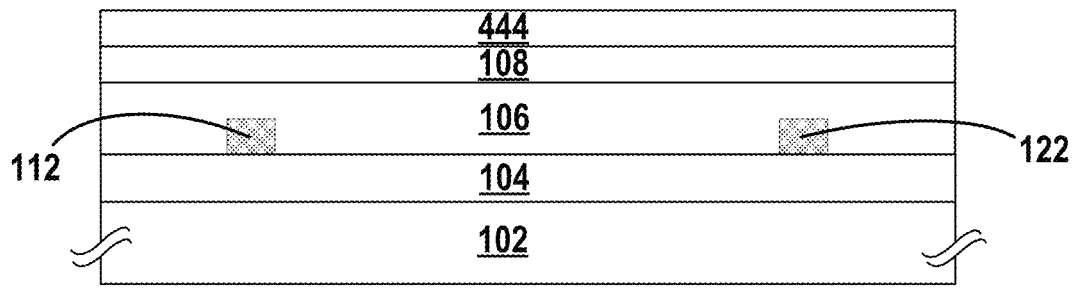
FIG. 4G is an illustration of a step in a method used to fabricate an electro-optic modulator, according to example embodiments.

FIG. 4G illustrates an etching step of the fabrication technique. In the etching step illustrated in FIG. 4G, the intermediate handle layer 442 may be etched away. The intermediate handle layer 442 may be etched using a chemical etch (e.g., a wet chemical etch or a dry chemical etch). Other techniques for removing the intermediate handle layer 442 are also possible and are contemplated herein.

Figure 4H:
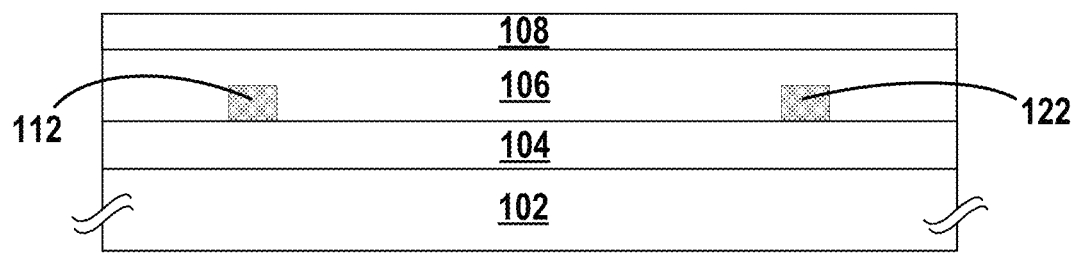
FIG. 4H is an illustration of a step in a method used to fabricate an electro-optic modulator, according to example embodiments.

FIG. 4H illustrates an etching step of the fabrication technique. In the etching step illustrated in FIG. 4H, the intermediate cladding layer 444 may be etched away. The intermediate cladding layer 444 may be etched using a chemical etch (e.g., a wet chemical etch or a dry chemical etch). Other techniques for removing the intermediate cladding layer 444 are also possible and are contemplated herein.

In some embodiments, the etching or other removal of the intermediate handle layer 442 and the intermediate cladding layer 444, as illustrated in FIGS. 4G and 4H, could happen in a single processing step. For example, a single etch (e.g., a single wet chemical etch or a single dry chemical etch) could be used to remove both the intermediate handle layer 442 and the intermediate cladding layer 444.

Figure 4I:
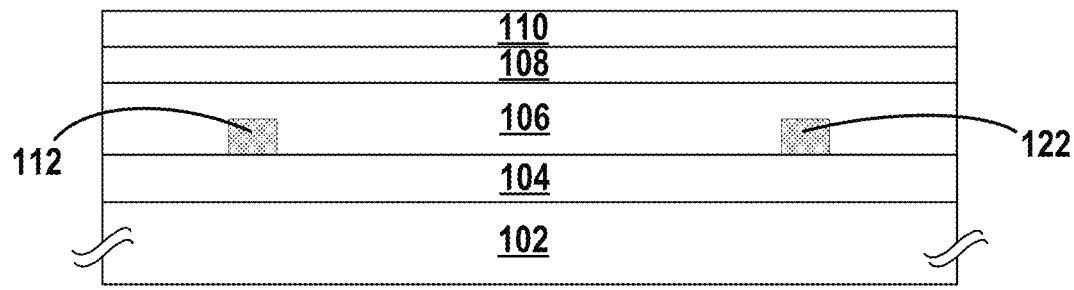
FIG. 4I is an illustration of a step in a method used to fabricate an electro-optic modulator, according to example embodiments.

FIG. 4I illustrates an oxide-providing step of the fabrication technique. For example, the oxide-providing step may include providing a third cladding layer 110 on the thin-film lithium niobate layer 108. This may encapsulate the thin-film lithium niobate layer 108 between the second cladding layer 106 and the third cladding layer 110. In some embodiments, the third cladding layer 110 may be a $SiO_2$ layer (e.g., having thickness between 80 nm and 120 nm). In some embodiments, the oxide-providing step may include depositing the third cladding layer 110 (e.g., using a chemical vapor deposition process, such as a plasma-enhanced chemical vapor deposition process).

In some embodiments, the electro-optic modulator 100 need not include the third cladding layer 110. Hence, in some embodiments of the fabrication technique, the oxide-providing step of FIG. 4I need not be performed. In such embodiments, the first cap 142 and the second cap 144 may be deposited directly onto the thin-film lithium niobate layer 108 without the intervening third cladding layer 110. The third cladding layer 110 may be included in the electro-optic modulator 100 to provide further fine-tuning for electro-optic coupling, within the modulation region 130, between a voltage signal applied across the plurality of electrodes and the optical signal propagating through the electro-optic modulator 100.

Figure 4J:
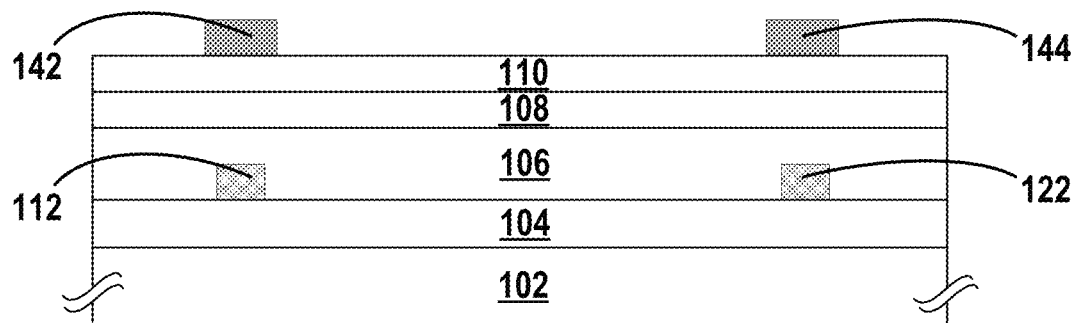
FIG. 4J is an illustration of a step in a method used to fabricate an electro-optic modulator, according to example embodiments.

FIG. 4J illustrates a cap-providing step of the fabrication technique. For example, the cap-providing step may include providing a first cap 142 and a second cap 144. The first cap 142 and the second cap 144 may be made of SiN, for example. In addition, the first cap 142 and the second cap 144 may be positioned over the first waveguide 112 and the second waveguide 122 in a modulation region 130 of the electro-optic modulator 100 (e.g., as illustrated in FIG. 4J). Further, the first cap 142 and the second cap 144 may be provided on the third cladding layer 110, as illustrated in FIG. 4J. In embodiments without the third cladding layer 110, the first cap 142 and the second cap 144 may instead be provided on the thin-film lithium niobate layer 108. Providing the first cap 142 and the second cap 144 may include depositing the first cap 142 and the second cap 144 using a chemical vapor deposition process (e.g., a plasma-enhanced chemical vapor deposition process). Further, providing the first cap 142 and the second cap 144 may include one or more photolithography steps (e.g., to define a mask through which a selective chemical vapor deposition process occurs). In some embodiments, the cap-providing step may include providing a cap layer (e.g., a SiN layer) and then selectively etching the cap layer (e.g., through one or more photolithography steps and/or one or more chemical etches) to define the first cap 142 and the second cap 144.

Figure 4K:
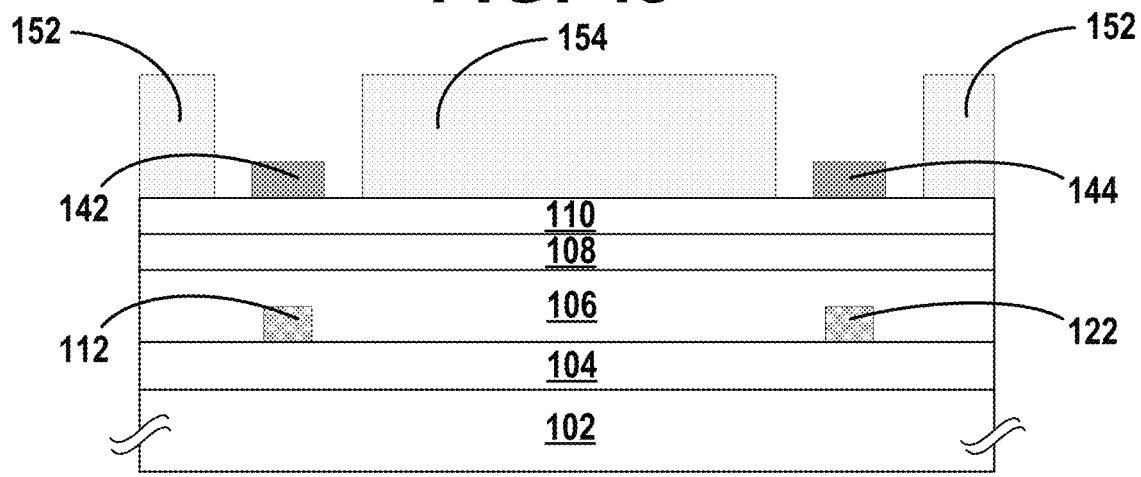
FIG. 4K is an illustration of a step in a method used to fabricate an electro-optic modulator, according to example embodiments.

FIG. 4K illustrates a metallization step of the fabrication technique. The metallization step may include providing metal (e.g., Cu, Ag, or Au) to define a plurality of electrodes 152, 154 (e.g., one or more ground electrodes 152 and/or one or more source electrodes 154 organized in a symmetric GSG/push-pull configuration for a Mach-Zehnder electro-optic modulator). Other configurations (e.g., source-ground-source (SGS) configurations) are also possible and contemplated herein. Further, electro-optic modulators that are not Mach-Zehnder electro-optic modulators may, nonetheless, include a plurality of electrodes across which a voltage signal can be applied. As illustrated in FIG. 4K, the plurality of electrodes 152, 154 may straddle the first cap 142 and/or the second cap 144 in a modulation region 130 of the electro-optic modulator 100 (e.g., as illustrated in FIG. 4K). Further, the plurality of electrodes 152, 154 may be provided on the third cladding layer 110, as illustrated in FIG. 4K. In embodiments without the third cladding layer 110, the plurality of electrodes 152, 154 may instead be provided on the thin-film lithium niobate layer 108. Providing the plurality of electrodes 152, 154 may include one or more photolithography steps.

In some embodiments, the fabrication technique use to fabricate the electro-optic modulator 100 may also include incorporating a coupler into the electro-optic modulator 100 (e.g., to couple an optical signal that is to be modulated into the electro-optic modulator 100). The coupler may couple the optical signal into an input waveguide. The input waveguide may be optically coupled to a modulation region 130 of the electro-optic modulator 100. For example, in the case of a Mach-Zehnder electro-optic modulator, the input waveguide may provide an input end of the first waveguide 112 and an input end of the second waveguide 122 each with a portion of the input optical signal (e.g., the input optical signal could be split between the first waveguide 112 along a first arm and the second waveguide 122 along a second arm). In some embodiments, incorporating the coupler may include incorporating a grating coupler adjacent to a portion of the input waveguide. The grating coupler may allow input electromagnetic waves (e.g., optical signals) to couple to the input waveguide.

Alternatively, in some embodiments, incorporating a coupler may include providing an edge-coupler. In some cases, an edge-coupler may experience lower coupling loss than a grating coupler. Incorporating an edge-coupler may include etching a portion of the handle layer 102, the first cladding layer 104, the second cladding layer 106, the thin-film lithium niobate layer 108, and/or the third cladding layer 110 to define a trench.

Figure 5:
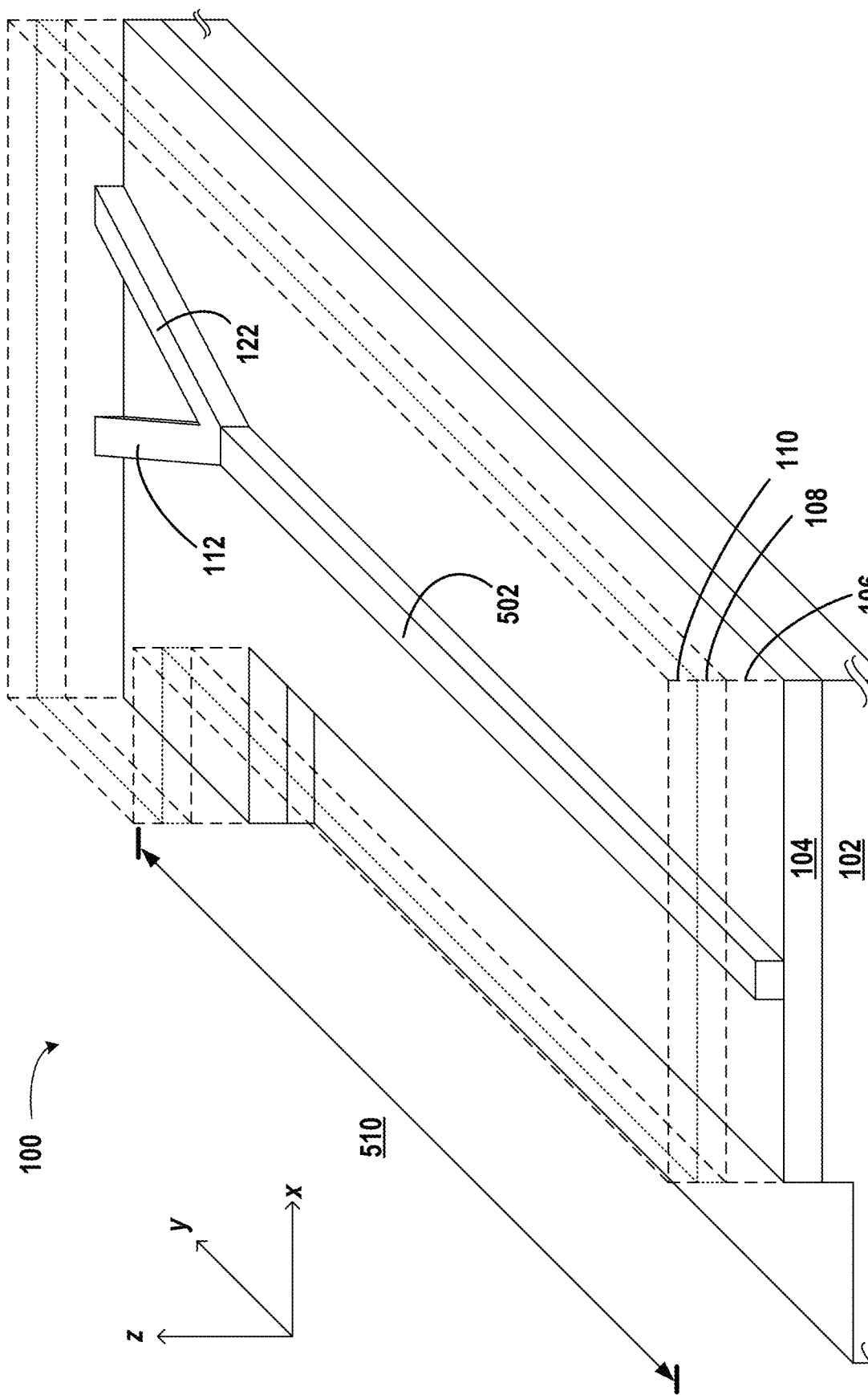
FIG. 5 is an isometric illustration of an electro-optic modulator with an edge-coupler, according to example embodiments.

FIG. 5 illustrates an example edge-coupler of the electro-optic modulator 100. As illustrated, a trench 510 may be etched within the handle layer 102 and through the first cladding layer 104, the second cladding layer 106, the thin-film lithium niobate layer 108, and the third cladding layer 110. The trench 510 may be positioned adjacent to a portion of an input waveguide 502. The portion of the input waveguide 502 may be located away from a modulation region 130 of the electro-optic modulator 100 (e.g., in an input coupling region of the electro-optic modulator 100) and, therefore, prior to the first waveguide 112/associated first arm of the Mach-Zehnder electro-optic modulator and the second waveguide 122/associated second arm of the Mach-Zehnder electro-optic modulator along a propagation direction of the optical signals. The input waveguide 502 may be configured to receive input electromagnetic waves from edge-coupling via the trench 510.

III. EXAMPLE PROCESSES

Figure 6:
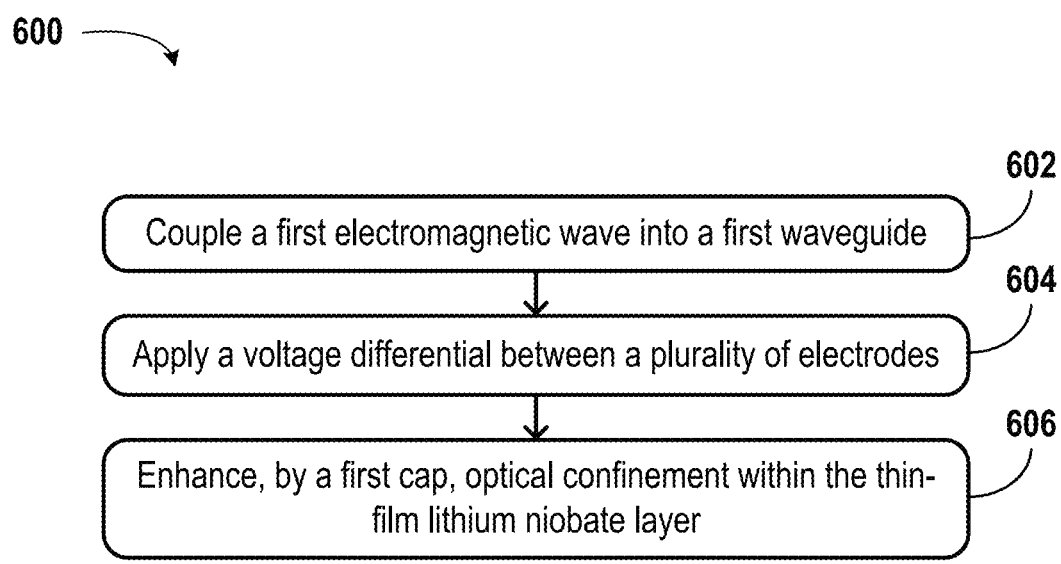
FIG. 6 is a flowchart illustrating a method, according to example embodiments.

FIG. 6 is a flowchart diagram of a method 600, according to example embodiments. The method 600 may be performed by a device (e.g., the electro-optic modulator 100 illustrated and described with reference to FIGS. 1A, 1B, and 2).

At block 602, the method 600 may include coupling a first electromagnetic wave into a first waveguide. The first waveguide may be at least partially encapsulated between a first cladding layer and a second cladding layer.

At block 604, the method 600 may include applying a voltage differential between a plurality of electrodes. The voltage differential may produce an electro-optic effect in a thin-film lithium niobate layer adjacent to the second cladding layer. The electro-optic effect may result in modulation of the first electromagnetic wave. The thin-film lithium niobate layer may be on an opposite side of the second cladding layer from the first waveguide. The plurality of electrodes may be positioned on an opposite side of the thin-film lithium niobate layer from the second cladding layer.

At block 606, the method 600 may include enhancing, by a first cap, optical confinement within the thin-film lithium niobate layer. The first cap may be positioned on an opposite side of the thin-film lithium niobate layer from the second cladding layer and on a same side of the thin-film lithium niobate layer as the plurality of electrodes.

Figure 7:
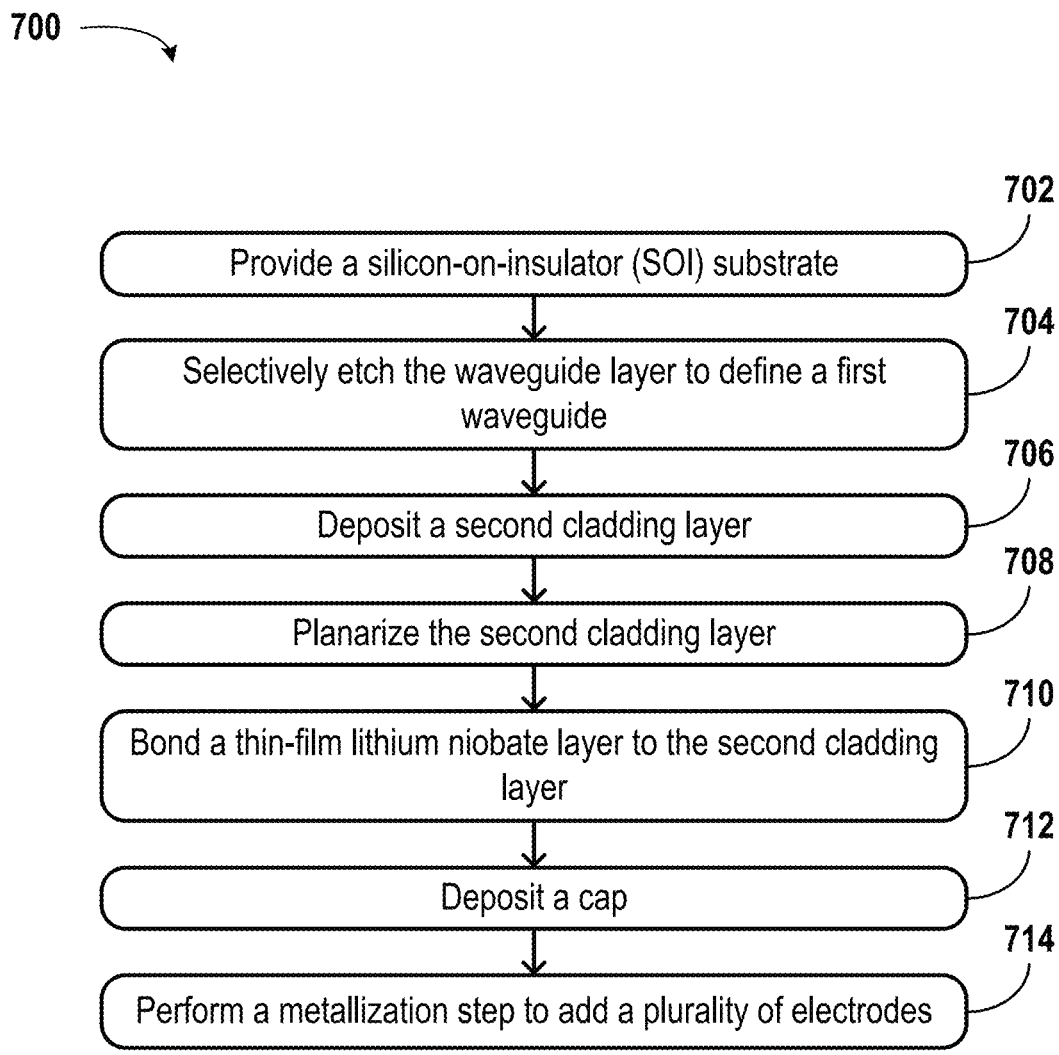
FIG. 7 is a flowchart illustrating a method, according to example embodiments.

FIG. 7 is a flowchart diagram of a method 700, according to example embodiments. The method 700 may be used to fabricate a device (e.g., the electro-optic modulator 100 illustrated and described with reference to FIGS. 1A, 1B, and 2). In some embodiments, the method 700 may correspond, at least in part, to the steps illustrated and described with reference to FIGS. 4A-4K.

At block 702, the method 700 may include providing a silicon-on-insulator (SOI) substrate. The SOI substrate may include a handle layer. The SOI substrate may also include a first cladding layer. In addition, the SOI substrate may include a waveguide layer.

At block 704, the method 700 may include selectively etching the waveguide layer to define a first waveguide.

At block 706, the method 700 may include depositing a second cladding layer.

At block 708, the method 700 may include planarizing the second cladding layer.

At block 710, the method 700 may include bonding a thin-film lithium niobate layer to the second cladding layer.

At block 712, the method 700 may include depositing a cap.

At block 714, the method 700 may include performing a metallization step to add a plurality of metallic electrodes.

In some embodiments, the method 700 may also include providing a grating coupler adjacent to a portion of an input waveguide. The input waveguide may be optically coupled to a first end of the first waveguide.

In some embodiments, the method 700 may also include selectively etching a portion of the handle layer and the first cladding layer to define a trench. The trench may be usable to edge-couple light into a portion of an input waveguide. In addition, the input waveguide may be optically coupled to a first end of the first waveguide.

In some embodiments of the method 700, a thickness of the first cladding layer may be between 2.5 µm and 3.5 µm.

In some embodiments of the method 700, selectively etching the waveguide layer to define the first waveguide may include at least one photolithography step.

In some embodiments of the method 700, depositing the second cladding layer may include performing a plasma-enhanced chemical vapor deposition process.

In some embodiments of the method 700, planarizing the second cladding layer may include performing a chemical-mechanical polishing process.

In some embodiments, the method 700 may also include, prior to bonding the thin-film lithium niobate layer to the second cladding layer, etching an alignment mark usable to align the thin-film lithium niobate layer when bonding the thin-film lithium niobate layer to the second cladding layer In some embodiments of the method 700, bonding the thin-film lithium niobate layer to the second cladding layer may include providing a wafer. The wafer may include an intermediate handle layer. The wafer may also include the thin-film lithium niobate layer. In addition, the wafer may include an intermediate cladding layer positioned in between the intermediate handle layer and the thin-film lithium niobate layer. In addition, bonding the thin-film lithium niobate layer to the second cladding layer may include bonding the wafer to the second cladding layer such that the thin-film lithium niobate layer is positioned closer to the first waveguide than the intermediate handle layer and the intermediate cladding layer. Further, bonding the thin-film lithium niobate layer to the second cladding layer may include etching away the intermediate handle layer. Additionally, bonding the thin-film lithium niobate layer to the second cladding layer may include etching away the intermediate cladding layer.

In some embodiments, the method 700 may also include prior to depositing the cap, depositing a third cladding layer. The third cladding layer may include $SiO_2$. However, it will be understood that other cladding layer materials are possible and contemplated.

IV. CONCLUSION

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, operation, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step, block, or operation that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer-readable medium such as a storage device including RAM, a disk drive, a solid state drive, or another storage medium.

The computer-readable medium can also include non-transitory computer-readable media such as computer-readable media that store data for short periods of time like register memory and processor cache. The computer-readable media can further include non-transitory computer-readable media that store program code and/or data for longer periods of time. Thus, the computer-readable media may include secondary or persistent long term storage, like ROM, optical or magnetic disks, solid state drives, compact-disc read-only memory (CD-ROM), for example. The computer-readable media can also be any other volatile or non-volatile storage systems. A computer-readable medium can be considered a computer-readable storage medium, for example, or a tangible storage device.

Moreover, a step, block, or operation that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

Embodiments of the present disclosure may thus relate to one of the enumerated example embodiments (EEEs) listed below.

EEE 1 is an electro-optic modulator comprising:
a first cladding layer;
a second cladding layer;
a first waveguide, wherein the first waveguide is at least partially encapsulated between the first cladding layer and the second cladding layer;
a thin-film lithium niobate layer adjacent to the second cladding layer, wherein the thin-film lithium niobate layer is on an opposite side of the second cladding layer from the first waveguide;
a first cap positioned on an opposite side of the thin-film lithium niobate layer from the second cladding layer, wherein the first cap enhances optical confinement within the thin-film lithium niobate layer; and
a plurality of electrodes positioned on an opposite side of the thin-film lithium niobate layer from the second cladding layer and on a same side of the thin-film lithium niobate layer as the first cap.

EEE 2 is the electro-optic modulator of EEE 1, wherein the first cap comprises SiN.

EEE 3 is the electro-optic modulator of either EEE 1 or EEE 2, wherein the second cladding layer has a thickness that varies between 100 nm and 200 nm across the second cladding layer.

EEE 4 is the electro-optic modulator of any of EEEs 1-3, wherein a thickness of the thin-film lithium niobate layer is between 300 nm and 700 nm.

EEE 5 is the electro-optic modulator of any of EEEs 1-4, wherein a thickness of each of the plurality of electrodes is between 1.5 μm and 2.5 μm.

EEE 6 is the electro-optic modulator of any of EEEs 1-5, wherein a width the first cap is between 1.5 μm and 3.0 μm.

EEE 7 is the electro-optic modulator of any of EEEs 1-6, wherein at least two electrodes of the plurality of electrodes straddle the first cap, and wherein a spacing between the at least two electrodes that straddle the first cap is between 5.0 µm and 15.0 µm.

EEE 8 is the electro-optic modulator of any of EEEs 1-7, wherein the electro-optic modulator is a Mach-Zehnder electro-optic modulator, wherein the Mach-Zehnder electro-optic modulator comprises a first arm and a second arm, wherein the first arm comprises the first cap and the first waveguide, and wherein a length of the first arm is between 5 mm and 10 mm.

EEE 9 is the electro-optic modulator of EEE 8, wherein the second arm comprises a second cap and a second waveguide, wherein the second cap is positioned on an opposite side of the thin-film lithium niobate layer from the second cladding layer and on a same side of the thin-film lithium niobate layer as the first cap and the plurality of electrodes, wherein second cap enhances optical confinement within the thin-film lithium niobate layer, wherein the second waveguide is at least partially encapsulated between the first cladding layer and the second cladding layer, wherein the plurality of electrodes comprises a first metal electrode, a second metal electrode, and a third metal electrode, wherein the first metal electrode and the second metal electrode straddle the first cap and are part of the first arm, and wherein the second metal electrode and the third metal electrode straddle the second cap and are part of the second arm.

EEE 10 is the electro-optic modulator of EEE 9, wherein the Mach-Zehnder modulator is arranged with the first arm and the second arm in a symmetric configuration, wherein the first metal electrode and the third metal electrode are ground electrodes, wherein the second metal electrode is a source electrode, and wherein a driving voltage formed between the first metal electrode and the second metal electrode is equal and opposite to a driving voltage formed between the third metal electrode and the second metal electrode.

EEE 11 is the electro-optic modulator of any of EEEs 8-10, wherein the electro-optic modulator has length L, and wherein a maximum voltage required to induce a π phase shift between the first arm and the second arm over L ($V_\pi$-L) is 5 V-cm for electromagnetic waves transmitted through the first waveguide that have wavelengths between 1260 nm and 1650 nm.

EEE 12 is the electro-optic modulator of any of EEEs 1-11, further comprising a third cladding layer positioned between the thin-film lithium niobate layer and the first cap.

EEE 13 is the electro-optic modulator of EEE 12, wherein a thickness of the third cladding layer is between 80 nm and 120 nm.

EEE 14 is the electro-optic modulator of any of EEEs 1-13, wherein a width of the first waveguide is between 220 nm and 260 nm.

EEE 15 is the electro-optic modulator of any of EEEs 1-14, wherein a width of the first cap is adiabatically tapered.

EEE 16 is the electro-optic modulator of any of EEEs 1-15, further comprising a handle layer positioned on an opposite side of the first cladding layer from the first waveguide, wherein the handle layer, the first cladding layer, and the first waveguide are provided from a silicon-on-insulator (SOI) wafer.

EEE 17 is the electro-optic modulator of EEE 16, wherein a trench is defined within the first cladding layer and the handle layer, wherein the first waveguide is optically coupled at a first end to an input waveguide, and wherein the input waveguide is configured to receive an electromagnetic wave from edge-coupling via the trench.

EEE 18 is the electro-optic modulator of any of EEEs 1-16, wherein the first waveguide is optically coupled at a first end to an input waveguide, and wherein the input waveguide is configured to receive an electromagnetic wave from a grating coupler.

EEE 19 is the electro-optic modulator of any of EEEs 1-18, wherein the first cladding layer and the second cladding layer comprise $SiO_2$.

EEE 20 is the electro-optic modulator of any of EEEs 1-19, wherein the first waveguide comprises Si or SiN.

EEE 21 is the electro-optic modulator of any of EEEs 1-20, wherein a length of the first waveguide is greater than a length of the thin-film lithium niobate layer, and wherein the first waveguide is tapered in width as it approaches the thin-film lithium niobate layer and as it runs away from the thin-film lithium niobate layer.

EEE 22 is the electro-optic modulator of any of EEEs 1-21, wherein the first waveguide is tapered in width in a portion of the first waveguide that is positioned beneath the thin-film lithium niobate layer.

EEE 23 is the electro-optic modulator of EEE 22, wherein the portion of the first waveguide that is positioned beneath the thin-film lithium niobate layer is tapered in width from between 900 nm and 1000 nm to between 320 nm and 360 nm and then to between 230 nm and 270 nm.

EEE 24 is a method comprising:
coupling a first electromagnetic wave into a first waveguide, wherein the first waveguide is at least partially encapsulated between a first cladding layer and a second cladding layer;
applying a voltage differential between a plurality of electrodes, wherein the voltage differential produces an electro-optic effect in a thin-film lithium niobate layer adjacent to the second cladding layer, wherein the electro-optic effect results in modulation of the first electromagnetic wave, wherein the thin-film lithium niobate layer is on an opposite side of the second cladding layer from the first waveguide, and wherein the plurality of electrodes is positioned on an opposite side of the thin-film lithium niobate layer from the second cladding layer; and
enhancing, by a first cap, optical confinement within the thin-film lithium niobate layer, wherein the first cap is positioned on an opposite side of the thin-film lithium niobate layer from the second cladding layer and on a same side of the thin-film lithium niobate layer as the plurality of electrodes.

EEE 25 is a method of manufacture comprising:
providing a silicon-on-insulator (SOI) substrate, wherein the SOI substrate comprises:
a handle layer;
a first cladding layer; and
a waveguide layer;
selectively etching the waveguide layer to define a first waveguide;
depositing a second cladding layer;
planarizing the second cladding layer;
bonding a thin-film lithium niobate layer to the second cladding layer;
depositing a cap; and
performing a metallization step to add a plurality of metallic electrodes.

EEE 26 is the method of EEE 25, further comprising providing a grating coupler adjacent to a portion of an input waveguide, wherein the input waveguide is optically coupled to a first end of the first waveguide.

EEE 27 is the method of EEE 25, further comprising selectively etching a portion of the handle layer and the first cladding layer to define a trench, wherein the trench is usable to edge-couple light into a portion of an input waveguide, and wherein the input waveguide is optically coupled to a first end of the first waveguide.

EEE 28 is the method of any of EEEs 25-27, wherein a thickness of the first cladding layer is between 2.5 µm and 3.5 µm.

EEE 29 is the method of any of EEEs 25-28, wherein selectively etching the waveguide layer to define the first waveguide comprises at least one photolithography step.

EEE 30 is the method of any of EEEs 25-29, wherein depositing the second cladding layer comprises performing a plasma-enhanced chemical vapor deposition process.

EEE 31 is the method of any of EEEs 25-30, wherein planarizing the second cladding layer comprises performing a chemical-mechanical polishing process.

EEE 32 is the method of any of EEEs 25-31, further comprising, prior to bonding the thin-film lithium niobate layer to the second cladding layer, etching an alignment mark usable to align the thin-film lithium niobate layer when bonding the thin-film lithium niobate layer to the second cladding layer.

EEE 33 is the method of any of EEEs 25-32, wherein bonding the thin-film lithium niobate layer to the second cladding layer comprises:
  providing a wafer comprising:
    an intermediate handle layer;
    the thin-film lithium niobate layer; and
    an intermediate cladding layer positioned in between the intermediate handle layer and the thin-film lithium niobate layer;
  bonding the wafer to the second cladding layer such that the thin-film lithium niobate layer is positioned closer to the first waveguide than the intermediate handle layer and the intermediate cladding layer;
  etching away the intermediate handle layer; and
  etching away the intermediate cladding layer.

EEE 34 is the method of any of EEEs 25-33, further comprising, prior to depositing the cap, depositing a third cladding layer, wherein the third cladding layer comprises $SiO_2$.

EEE 35 is a system comprising:
  a means-for coupling a first electromagnetic wave into a first waveguide, wherein the first waveguide is at least partially encapsulated between a first cladding layer and a second cladding layer;
  a means-for applying a voltage differential between a plurality of electrodes, wherein the voltage differential produces an electro-optic effect in a thin-film lithium niobate layer adjacent to the second cladding layer, wherein the electro-optic effect results in modulation of the first electromagnetic wave, wherein the thin-film lithium niobate layer is on an opposite side of the second cladding layer from the first waveguide, and wherein the plurality of electrodes is positioned on an opposite side of the thin-film lithium niobate layer from the second cladding layer; and
  a means-for enhancing, by a first cap, optical confinement within the thin-film lithium niobate layer, wherein the first cap is positioned on an opposite side of the thin-film lithium niobate layer from the second cladding layer and on a same side of the thin-film lithium niobate layer as the plurality of electrodes.

EEE 36 is a system comprising:
  a means-for providing a silicon-on-insulator (SOI) substrate, wherein the SOI substrate comprises:
    a handle layer;
    a first cladding layer; and
    a waveguide layer;
  a means-for selectively etching the waveguide layer to define a first waveguide;
  a means-for depositing a second cladding layer;
  a means-for planarizing the second cladding layer;
  a means-for bonding a thin-film lithium niobate layer to the second cladding layer;
  a means-for depositing a cap; and
  a means-for performing a metallization step to add a plurality of metallic electrodes.

What is claimed:

1. An electro-optic modulator comprising:
   a first cladding layer;
   a second cladding layer;
   a first waveguide, wherein the first waveguide is at least partially encapsulated between the first cladding layer and the second cladding layer;
   a thin-film lithium niobate layer adjacent to the second cladding layer, wherein the thin-film lithium niobate layer is on an opposite side of the second cladding layer from the first waveguide;
   a first cap positioned on an opposite side of the thin-film lithium niobate layer from the second cladding layer, wherein the first cap enhances optical confinement within the thin-film lithium niobate layer, and wherein enhancing optical confinement within the thin-film lithium niobate layer comprises reducing a lateral spread of a propagating mode within the thin-film lithium niobate layer; and
   a plurality of electrodes positioned on an opposite side of the thin-film lithium niobate layer from the second cladding layer and on a same side of the thin-film lithium niobate layer as the first cap.

2. The electro-optic modulator of claim 1, wherein the electro-optic modulator is a Mach-Zehnder electro-optic modulator, wherein the Mach-Zehnder electro-optic modulator comprises a first arm and a second arm, wherein the first arm comprises the first cap and the first waveguide, and wherein a length of the first arm is between 5 mm and 10 mm.

3. The electro-optic modulator of claim 2, wherein the second arm comprises a second cap and a second waveguide, wherein the second cap is positioned on an opposite side of the thin-film lithium niobate layer from the second cladding layer and on a same side of the thin-film lithium niobate layer as the first cap and the plurality of electrodes, wherein second cap enhances optical confinement within the thin-film lithium niobate layer, wherein the second waveguide is at least partially encapsulated between the first cladding layer and the second cladding layer, wherein the plurality of electrodes comprises a first metal electrode, a second metal electrode, and a third metal electrode, wherein the first metal electrode and the second metal electrode straddle the first cap and are part of the first arm, and wherein the second metal electrode and the third metal electrode straddle the second cap and are part of the second arm.

4. The electro-optic modulator of claim 3, wherein the Mach-Zehnder modulator is arranged with the first arm and the second arm in a symmetric configuration, wherein the first metal electrode and the third metal electrode are ground electrodes, wherein the second metal electrode is a source electrode, and wherein a driving voltage formed between the first metal electrode and the second metal electrode is equal and opposite to a driving voltage formed between the third metal electrode and the second metal electrode.

5. The electro-optic modulator of claim 2, wherein the electro-optic modulator has a modulation region, wherein the modulation region has length L, and wherein a maximum voltage required to induce a π phase shift between the first arm and the second arm over L ($V_\pi$-L) is 5 V-cm for electromagnetic waves transmitted through the first waveguide that have wavelengths between 1260 nm and 1650 nm.

6. The electro-optic modulator of claim 1, further comprising a third cladding layer positioned between the thin-film lithium niobate layer and the first cap.

7. The electro-optic modulator of claim 1, wherein a width of the first cap is adiabatically tapered.

8. The electro-optic modulator of claim 1, further comprising a handle layer positioned on an opposite side of the first cladding layer from the first waveguide, wherein the handle layer, the first cladding layer, and the first waveguide are provided from a silicon-on-insulator (SOI) wafer.

9. The electro-optic modulator of claim 8, wherein a trench is defined within the first cladding layer and the handle layer, wherein the first waveguide is optically coupled at a first end to an input waveguide, and wherein the input waveguide is configured to receive an electromagnetic wave from edge-coupling via the trench.

10. The electro-optic modulator of claim 1, wherein the first waveguide is optically coupled at a first end to an input waveguide, and wherein the input waveguide is configured to receive an electromagnetic wave from a grating coupler.

11. The electro-optic modulator of claim 1, wherein a length of the first waveguide is greater than a length of the thin-film lithium niobate layer, wherein the first waveguide is tapered in width as it approaches the thin-film lithium niobate layer and as it runs away from the thin-film lithium niobate layer, and wherein the first waveguide is tapered in width in a portion of the first waveguide that is positioned beneath the thin-film lithium niobate layer.

12. The electro-optic modulator of claim 1, wherein the first cap comprises SiN.

13. A method comprising:
coupling a first electromagnetic wave into a first waveguide, wherein the first waveguide is at least partially encapsulated between a first cladding layer and a second cladding layer;
applying a voltage differential between a plurality of electrodes, wherein the voltage differential produces an electro-optic effect in a thin-film lithium niobate layer adjacent to the second cladding layer, wherein the electro-optic effect results in modulation of the first electromagnetic wave, wherein the thin-film lithium niobate layer is on an opposite side of the second cladding layer from the first waveguide, and wherein the plurality of electrodes is positioned on an opposite side of the thin-film lithium niobate layer from the second cladding layer; and
enhancing, by a first cap, optical confinement within the thin-film lithium niobate layer, wherein enhancing optical confinement within the thin-film lithium niobate layer comprises reducing a lateral spread of a propagating mode within the thin-film lithium niobate layer, and wherein the first cap is positioned on an opposite side of the thin-film lithium niobate layer from the second cladding layer and on a same side of the thin-film lithium niobate layer as the plurality of electrodes.

14. A method of manufacture comprising:
providing a silicon-on-insulator (SOI) substrate, wherein the SOI substrate comprises:
a handle layer;
a first cladding layer; and
a waveguide layer;
selectively etching the waveguide layer to define a first waveguide;
depositing a second cladding layer;
planarizing the second cladding layer;
bonding a thin-film lithium niobate layer to the second cladding layer;
depositing a cap on an opposite side of the thin-film lithium niobate layer from the second cladding layer, wherein the cap is configured to enhance optical confinement within the thin-film lithium niobate layer; and
performing a metallization step to add a plurality of electrodes.

15. The method of claim 14, further comprising providing a grating coupler adjacent to a portion of an input waveguide, wherein the input waveguide is optically coupled to a first end of the first waveguide.

16. The method of claim 14, further comprising selectively etching a portion of the handle layer and the first cladding layer to define a trench, wherein the trench is usable to edge-couple light into a portion of an input waveguide, and wherein the input waveguide is optically coupled to a first end of the first waveguide.

17. The method of claim 14, wherein depositing the second cladding layer comprises performing a plasma-enhanced chemical vapor deposition process.

18. The method of claim 14, wherein planarizing the second cladding layer comprises performing a chemical-mechanical polishing process.

19. The method of claim 14, further comprising, prior to bonding the thin-film lithium niobate layer to the second cladding layer, etching an alignment mark usable to align the thin-film lithium niobate layer when bonding the thin-film lithium niobate layer to the second cladding layer.

20. The method of claim 14, wherein bonding the thin-film lithium niobate layer to the second cladding layer comprises:
providing a wafer comprising:
an intermediate handle layer;
the thin-film lithium niobate layer; and
an intermediate cladding layer positioned in between the intermediate handle layer and the thin-film lithium niobate layer;
bonding the wafer to the second cladding layer such that the thin-film lithium niobate layer is positioned closer to the first waveguide than the intermediate handle layer and the intermediate cladding layer;
etching away the intermediate handle layer; and
etching away the intermediate cladding layer.

* * * * *